US012188566B2

(12) United States Patent
Ito et al.

(10) Patent No.: US 12,188,566 B2
(45) Date of Patent: Jan. 7, 2025

(54) FOUR-WAY VALVE, VALVE UNIT, TEMPERATURE CONTROL SYSTEM

(71) Applicant: CKD CORPORATION, Aichi (JP)

(72) Inventors: Akihiro Ito, Aichi (JP); Hiroki Doi, Aichi (JP); Masaya Yamauchi, Aichi (JP); Masayuki Kouketsu, Aichi (JP)

(73) Assignee: CKD CORPORATION, Aichi (JP)

( * ) Notice: Subject to any disclaimer, the term of this patent is extended or adjusted under 35 U.S.C. 154(b) by 0 days.

(21) Appl. No.: 18/446,479

(22) Filed: Aug. 9, 2023

(65) Prior Publication Data
US 2023/0383854 A1 Nov. 30, 2023

Related U.S. Application Data

(63) Continuation of application No. PCT/JP2021/047839, filed on Dec. 23, 2021.

(30) Foreign Application Priority Data

Feb. 25, 2021 (JP) .................. 2021-028783

(51) Int. Cl.
F16K 11/08 (2006.01)
F16K 11/085 (2006.01)
F16K 27/06 (2006.01)
F16K 31/04 (2006.01)
G05D 23/13 (2006.01)

(52) U.S. Cl.
CPC ........ F16K 11/0856 (2013.01); F16K 27/065 (2013.01); F16K 31/041 (2013.01); G05D 23/1306 (2013.01)

(58) Field of Classification Search
CPC .. F16K 11/0856; F16K 27/065; F16K 31/041; G05D 23/1306
See application file for complete search history.

(56) References Cited

FOREIGN PATENT DOCUMENTS

JP H05-141817 A 6/1993
JP H11-082794 A 3/1999
(Continued)

OTHER PUBLICATIONS

International Preliminary Report on Patentability issued in corresponding International Application No. PCT/JP2021/047839, mailed Sep. 7, 2023, 12 pages.
(Continued)

Primary Examiner — P. Macade Nichols
(74) Attorney, Agent, or Firm — Osha Bergman Watanabe & Burton LLP

(57) ABSTRACT

A four-way valve includes a body and a valve component. The body includes a valve chamber and first to fourth communication channels which communicate with the valve chamber at positions arranged in sequence in a predefined rotational direction and cause the valve chamber to communicate with an outside. The valve component is rotatable in the predefined rotational direction and switches the four-way valve to be in at least one of: a first state in which the first and second communication channels communicate with the first region and the third and fourth communication channels communicate with the third region; and a second state in which the second communication channel communicates with the first region, the third communication channel communicates with the second region, and the first and fourth communication channels communicate with the third region.

11 Claims, 12 Drawing Sheets

(56) References Cited

FOREIGN PATENT DOCUMENTS

| | | |
|---|---|---|
| JP | 2012-047192 A | 3/2012 |
| JP | 2013-256964 A | 12/2013 |
| WO | 2020/246423 A1 | 12/2020 |

OTHER PUBLICATIONS

International Search Report issued in corresponding International Application No. PCT/JP2021/047839 mailed Feb. 1, 2022 (6 pages).
Written Opinion issued in corresponding International Application No. PCT/JP2021/047839 mailed Feb. 1, 2022 (4 pages).

FOUR-WAY VALVE, VALVE UNIT, TEMPERATURE CONTROL SYSTEM

CROSS-REFERENCE TO RELATED APPLICATION

This application claims priority from Japanese Patent Application No. 2021-028783, filed on Feb. 25, 2021, the contents of which are incorporated herein by reference.

BACKGROUND

1. Technical Field

The present disclosure relates to a four-way valve.

2. Description of Related Art

A four-way valve that includes a body and a valve component has been known (see Japanese Patent Application Laid-Open (kokai) No. H11-82794). The body includes first to fourth communication channels (arranged in a clockwise direction) that allow a valve chamber to communicate with the outside. The valve component divides the valve chamber into a first region and a second region. The valve component is rotatable. The valve component of the four-way valve switches between a first state and a second state. In the first state, the first communication channel and the second communication channel communicate with the first region and the third communication channel and the fourth communication channel communicate with the second region. In the second state, the second communication channel and the third communication channel communicate with the first region and the fourth communication channel and the first communication channel communicate with the second region.

The four-way valve allows the second communication channel and the third communication channel communicate with each other via the first region when the fourth communication channel and the first communication channel communicate with the second region in the second state. That is, the second communication channel and the third communication channel cannot be isolated from each other when the fourth communication channel and the first communication channel communicate with the second region.

SUMMARY

One or more embodiments of the present disclosure provide a four-way valve that can isolate the second communication channel from the third communication channel in a state that the fourth communication channel and the first communication channel communicate with each other.

One aspect of the present disclosure includes a four-way valve that includes: a body and a valve component. The body includes: a valve chamber; and a first communication channel, a second communication channel, a third communication channel, a fourth communication channel communicating with the valve chamber at positions arranged in sequence in a predefined rotational direction and causing the valve chamber to communicate with an outside. The valve component divides the valve chamber into a first region, a second region, and a third region arranged in sequence in the predefined rotational direction, and is rotatable in the predefined rotational direction. The valve component switches the four-way valve to be in at least one of: a first state in which the first communication channel and the second communication channel communicate with the first region and the third communication channel and the fourth communication channel communicate with the third region; and a second state in which the second communication channel communicates with the first region, the third communication channel communicates with the second region and the fourth communication channel and the first communication channel communicate with the third region.

The body includes: the valve chamber; and the first communication channel, the second communication channel, the third communication channel, the fourth communication channel that communicate with the valve chamber at the positions arranged in sequence in the predefined rotational direction and cause the valve chamber to communicate with the outside. The valve component divides the valve chamber into the first region, the second region, and the third region arranged in sequence in the predefined rotational direction. The valve component is rotatable in the predefined rotational direction. According to the configuration, the state of communication of the first communication channel, the second communication channel, the third communication channel, and the fourth communication channel with the first region, the second region, and third region can be altered.

The valve component switches the four-way valve to be in the first state in which the first communication channel and the second communication channel communicate with the first region and the third communication channel and the fourth communication channel communicate with the third region. Therefore, a fluid can be delivered to an object to be controlled via the first communication channel, the first region, and the second communication channel and discharged from the object via the third communication channel, the third region, and the fourth communication channel. The valve component switches the four-way valve to be in the second state in which the second communication channel communicates with the first region, the third communication channel communicates with the second region, and the fourth communication channel and the first communication channel communicate with the third region. Therefore, the second communication channel and the third communication channel are spaced apart from each other while the fourth communication channel communicates with the first communication channel. During returning of the delivered fluid via the first communication channel, the third region, the fourth communication channel, the fluid is less likely to flow between the second communication channel and the third communication channel.

In a second aspect, the valve chamber has a columnar shape. Further, a first position at which the first communication channel communicates with the valve chamber, a second position at which the second communication channel communicates with the valve chamber, a third position at which the third communication channel communicates with the valve chamber, and a fourth position at which the fourth communication channel communicates with the valve chamber are arranged in sequence in the predefined rotational direction along one of circumferential directions of the valve chamber. The valve component includes a first divider, a second divider, and a third divider arranged in sequence in the predefined rotational direction to divide the valve chamber in the predefined rotational direction. In the predefined rotational direction: a distance between the first divider and the second divider is greater than a distance between the first position and the second position and less than a distance between the first position and the third position and a distance between the fourth position and the second position; a distance between the second divider and the third divider is less than a distance between the second position and the third position; and a distance between the third divider and the first divider is greater than a distance between the third position and the fourth position and a distance between the fourth position and the first position and less than a distance between the third position and the first position and a distance between the second position and the fourth position.

The valve chamber has the columnar shape. Further, the first position at which the first communication channel communicates with the valve chamber, the second position at which the second communication channel communicates with the valve chamber, the third position at which the third communication channel communicates with the valve chamber, and the fourth position at which the fourth communication channel communicates with the valve chamber are arranged in sequence in the predefined rotational direction along one of circumferential directions of the valve chamber. According to the configuration, a plurality of communication channels can be isolated or communicated according to the positions at which the valve chamber is divided in the predefined rotational direction.

The valve component includes the first divider, the second divider, and the third divider arranged in sequence in the predefined rotational direction to divide the valve chamber in the predefined rotational direction. According to the configuration, the first region is defined between the first diving portion and the second divider, the second region is defined between the second divider and the third divider, and the third region is defined between the third divider and the first divider.

In the predefined rotational direction, the distance between the first divider and the second divider is greater than the distance between the first position and the second position. According to the configuration, the first communication channel and the second communication channel can communicate with a gap between the first divider and the second divider, that is, the first region. In the predefined rotational direction, the distance between the first divider and the second divider is less than the distance between the first position and the third position. According to the configuration, the first communication channel, the second communication channel, and the third communication channel are less likely to communicate with the first region. In the predefined rotational direction, the distance between the first divider and the second divider is less than the distance between the fourth position and the second position. According to the configuration, the fourth communication channel, the first communication channel, and the second communication channel are less likely to communicate with the first region.

In the predefined rotational direction, the distance between the second divider and the third divider is less than the distance between the second position and the third position. According to the configuration, the four-way valve can be switched to be in the state in which the second communication channel and the third communication channel do not communicate with a gap between the second divider and the third divider, that is, the second region.

In the predefined rotational direction, the distance between the third divider and the first divider is greater than the distance between the third position and the fourth position. According to the configuration, the third communication channel and the fourth communication channel can communicate with a gap between the third divider and the first divider, that is, the third region. In the predefined rotational direction, the distance between the third divider and the first divider is less than the distance between the third position and the first position. According to the configuration, the third communication channel, the fourth communication channel, and the first communication channel are less likely to communicate with the third region. In the predefined rotational direction, the distance between the third divider and the first divider is less than the distance between the second position and the fourth position. According to the configuration, the third communication channel, the fourth communication channel, and the first communication channel are less likely to communicate with the third region.

Therefore, the first state in which the first communication channel and the second communication channel communicate with the first region and the third communication channel and the fourth communication channel communicate with the third region can be set.

In the predefined rotational direction, the distance between the third divider and the first divider is greater than the distance between the fourth position and the first position. According to the configuration, the fourth communication channel and the first communication channel can communicate with the gap between the third divider and the first divider, that is, the third region.

Therefore, the second state in which the second communication channel communicates with the first region, the third communication channel communicates with the second region, and the fourth communication channel and the first communication channel communicate with the third region can be set.

In a third aspect, the valve component includes a center portion that extends in the axial direction of the valve chamber. The center portion is rotatable about a central axis of the valve chamber. The first divider, the second divider, and the third divider have plate shapes and extend from the center portion in a radial direction of the valve chamber. The valve component is provided in such a simple configuration.

A fourth aspect includes a valve unit comprising: the first four-way valve and the second four-way valve, which are four-way valves according to any one of the first aspect to third aspect; and a driver rotating the valve component of the first four-way valve and the valve component of the second four-way valve such that phases (or rotation angles) of the valve components are shifted from each other by 90° in the predefined rotational direction.

The valve unit includes the first four-way valve and the second four-way valve, each of which may be the four-way valve in any one of the first aspect to the third aspect. The drive rotates the valve component of the first four-way valve and the valve component of the second four-way valve such that the phases are shifted from each other by 90° in the predefined rotational direction. According to the configuration, the first four-way valve and the second four-way valve can be driven in different states and in conjunction with each other by a single driver.

A fifth aspect includes a first magnet coupling enabling non-contact torque transmission between the valve component of the first four-way valve and the driver and a second magnet coupling enabling non-contact torque transmission between the valve component of the second four-way valve and the driver.

According to the configuration, the first magnet coupling enables non-contact torque transmission between the valve component of the first four-way valve and the driver. Therefore, the valve component of the first four-way valve in a sealed state can easily rotate and heat transmission between the valve component of the first four-way valve and the driver can be reduced. Similarly, the second magnet coupling enables non-contact torque transmission between the valve component of the second four-way valve and the driver. Therefore, the valve component of the second four-way valve in a sealed state can easily rotate and heat transmission between the valve component of the second four-way valve and the driver can be reduced. Further, even if a temperature of a fluid, the flow of which is controlled with the first four-way valve is different from a temperature of a fluid, the flow of which is controlled with the second four-way valve, heat transmission between the valve component of the first four-way valve and the valve component of the second four-way valve via the driver is less likely to occur.

A sixth aspect includes a temperature control system that includes the valve unit in the fourth aspect or the fifth aspect, a first adjustment device, a second adjustment device, and an object to be controlled. The first adjustment device includes a first intake port and a first discharge port, takes a fluid therein through the first intake port, adjusts a temperature of the fluid to a first temperature, and discharges the fluid through the first discharge port. The second adjustment device includes a second intake port and a second discharge port, takes a fluid therein through the second intake port, adjusts a temperature of the fluid to a second temperature less than the first temperature, and discharges the fluid through the second discharge port. The object to be controlled includes an inlet, a channel, and an outlet. The fluid enters through the inlet, flows through the channel, and flows out through the outlet. In the first four-way valve, the first communication channel is coupled to the first discharge port via the channel, the second communication channel is coupled to the inlet via the channel, the third communication channel is coupled to the outlet via the channel, and the fourth communication channel is coupled to the first intake port via the channel. In the second four-way valve, the first communication channel is coupled to the second discharge port via the channel, the second communication channel is coupled to the inlet via the channel, the third communication channel is coupled to the outlet via the channel, and the fourth communication channel is coupled to the second intake port via the channel.

The first adjustment device includes the first intake port and the first discharge port. The first adjustment device takes the fluid therein through the first intake port, adjusts the temperature of the fluid to the first temperature, and discharges the fluid through the first discharge port. The second adjustment device includes the second intake port and the second discharge port. The second adjustment device takes the fluid therein through the second intake port, adjusts the temperature of the fluid to the second temperature that is less than the first temperature, and discharges the fluid through the second discharge port. The object includes the inlet, the flow channel, and the outlet. The fluid entering through the inlet flows through the channel and out of the object through the outlet.

In first four-way valve, the first communication channel is coupled to the first discharge port via the channel, the second communication channel is coupled to the inlet via the channel, the third communication channel is coupled to the outlet via the channel, and the fourth communication channel is coupled to the first intake port. By rotating the valve component of the first four-way valve by the driver to switch the first four-way valve to be in the first state in which the first communication channel and the second communication channel communicate with the first region and the third communication channel and the fourth communication channel communicate with the third region, the fluid discharged from the first adjustment device flows through the channel of the object and thus the temperature of the object can be adjusted close to the first temperature. Similarly, in second four-way valve, the first communication channel is coupled to the second discharge port via the channel, the second communication channel is coupled to the inlet via the channel, the third communication channel is coupled to the outlet via the channel, and the fourth communication channel is coupled to the second intake port. By rotating the valve component of the second four-way valve by the driver to switch the state of the second four-way valve to be in the first state, the fluid discharged from the second adjustment device flows through the channel of the object and thus the temperature of the object can be adjusted close to the second temperature.

By rotating the valve component of the first four-way valve by the driver to switch the first four-way valve to be in the second state in which the second communication channel communicates with the first region, the third communication channel communicates with the second region, and the fourth communication channel and the first communication channel communicate with the third region, the fluid discharged from the first adjustment device returns to the first adjustment device via the first communication channel, the third region, and the fourth communication channel of the first four-way valve and thus the temperature of the object can be maintained. Similarly, by rotating the valve component of the second four-way valve by the driver to switch the second four-way valve to be in the second state, the fluid discharged from the second adjustment device returns to the second adjustment device via the first communication channel, the third region, and the fourth communication channel of the second four-way valve and thus the temperature of the object can be maintained.

A seventh aspect includes a first flow channel block and a second flow channel block. The first flow channel block defines at least a part of a channel between the first discharge port and the first communication channel of the first four-way valve and at least a part of a channel between the first intake port and the fourth communication channel of the first four-way valve. The second flow channel block is spaced a part from the first flow channel block. The second flow channel block defines at least a part of a channel between the second discharge port and the first communication channel of the second four-way valve and at least a part of a channel between the second intake portion and the fourth communication channel of the second four-way valve. The channel between the second communication channel of the first four-way valve and the inlet and the channel between the second communication channel of the second four-way valve and the inlet are coupled to each other at a join located upstream of the inlet. The channel between the second communication channel of the second four-way valve and the join is defined by a first duct in which a first check valve is disposed to allow flow of the fluid from the second communication channel of the first four-way valve to the join and to prohibit flow of the fluid from the join to the second communication channel of the first four-way valve. The channel between the second communication channel of the second four-way valve and the join is defined by a second duct in which a second check valve is disposed to allow flow of the fluid from the second communication channel of the second four-way valve to the join and to prohibit flow of the fluid from the join to the second communication channel of the second four-way valve.

The first flow channel block defines at least the part of the channel between the first discharge port and the first communication channel of the first four-way valve and at least the part of the channel between the fourth communication channel of the first four-way valve and the first intake port. According to the configuration, the fluid flows between the first adjustment device and the first four-way valve via the channel in the first flow channel block. The second flow channel block defines at least the part of the channel between the second discharge port and the first communication channel of the second four-way valve and at least the part of the channel between the fourth communication channel of the second four-way valve and the second intake port. According to the configuration, the fluid flows between the second adjustment device and the second four-way valve via the channel in the second flow channel block. The second flow channel block is spaced apart from the first flow channel block. Therefore, heat transmission between the fluid discharged from the first adjustment device and having the first temperature and the fluid discharged from the second adjustment device and having the second temperature via the first flow channel block and the second flow channel block is less likely to occur.

The channel between the second communication channel of the first four-way valve and the inlet and the channel between the second communication channel of the second four-way valve and the inlet are coupled to each other at the join located upstream of the inlet. The channel between the second communication channel of the first four-way valve and the join is defined by the first duct. The channel between the second communication channel of the second four-way valve and the join is defined by the second duct that is different from the first duct. Therefore, heat transmission between the fluid that flows from the second communication channel of the first four-way valve to the join and the fluid that flows from the second communication channel of the second four-way valve to the join via the first duct and the second duct is less likely to occur.

The first check valve is disposed in the first duct to allow the flow of the fluid from the second communication channel of the first four-way valve to the join and to prohibit the flow of the fluid from the join to the second communication channel of the first four-way valve. According to the configuration, the fluid that flows into the object via the second duct is less likely to flow back to the second flow channel of the first four-way valve via the first duct. The second check valve is disposed in the second duct to allow the flow of the fluid from the second communication channel of the second four-way valve to the join and to prohibit the flow of the fluid from the join to the second communication channel of the second four-way valve. According to the configuration, the fluid that flows into the object via the first duct is less likely to flow back to the second flow channel of the second four-way valve via the second duct. The fluid that flows to the join via the first duct and the fluid that flows to the join via the second duct are less likely to be mixed and thus direct heat transmission between them is less likely to occur.

An eighth aspect includes a support that support both the first flow channel block and the second flow channel block and a heat insulator between the first flow channel block and the second flow channel block.

The first flow channel block and the second flow channel block are supported by the same support. According to the configuration, the first flow channel block and the second flow channel block are collectively disposed on the same support. In this configuration, heat transmission may occur between the first flow channel block and the second flow channel block via the support. Because the heat insulator is disposed between the first flow channel block and the second flow channel block, the heat transmission between the first flow channel block and the second flow channel block via the support is less likely to occur.

In a ninth aspect, the driver switches the first and second four-way valves, by rotating the valve component of the first four-way valve and the valve component of the second four-way valve such that the phases are shifted from each other by 90° in the predefined rotational direction, to be in at least one of: a first distributing state in which the first four-way valve is in the first state and the second four-way valve is in the second state; a non-distributing state in which the first four-way valve is in the second state and the second four-way valve is in the second state; and a second distributing state in which the first four-way valve is in the second state and the second four-way valve is in the first state.

The driver switches the first and second four-way valves by rotating the valve component of the first four-way valve and the valve component of the second four-way valve such that the phases are shifted from each other by 90° in the predefined rotational direction, to be in the first distributing state in which the first four-way valve is in the first state and the second four-way valve is in the second state. According to the configuration, the fluid discharged from the first adjustment device and having the first temperature flows through the channel of the object and the fluid discharged from the second adjustment device and having the second temperature are returned to the second adjustment device without flowing through the channel of the object. Therefore, the temperature of the object is adjusted close to the first temperature.

The driver switches the first and second four-way valves, by rotating the valve component of the first four-way valve and the valve component of the second four-way valve such that the phases are shifted from each other by 90° in the predefined rotational direction, to be in the non-distributing state in which the first four-way valve is in the second state and the second four-way valve is in the second state. According to the configuration, the fluid discharged from the first adjustment device and having the first temperature returns to the first adjustment device without flowing through the channel of the object and the fluid discharged from the second adjustment device and having the second temperature are returned to the second adjustment device without flowing through the channel of the object. Therefore, the temperature of the object is maintained.

The driver switches the first and second four-way valves, by rotating the valve component of the first four-way valve and the valve component of the second four-way valve such that the phases are shifted from each other by 90° in the predefined rotational direction, to be in the second distributing state in which the first four-way valve is in the second state and the second four-way valve is in the first state. According to the configuration, the fluid discharged from the first adjustment device and having the first temperature returns to the first adjustment device without flowing through the channel of the object and the fluid discharged from the second adjustment device and having the second temperature flows through the channel of the object. Therefore, the temperature of the object is adjusted close to the second temperature.

A tenth aspect includes a controller that sets a target temperature of the object to be greater than the second temperature and less than the first temperature. The controller causes the driver to control a target temperature by: in a case that a temperature of the object is greater than the second temperature and less than the target temperature and the first temperature, switching the first and second four-way valves to be in the first distributing state; in a case that the temperature of the object is greater than the second temperature and the target temperature and less than the first temperature, switching the first and second four-way valves to be in the second distributing state; and in a case that the temperature of the object is greater than the second temperature, less than the first temperature, and within a predefined temperature range including the target temperature, switching the first and second four-way valves to be in the non-distributing state in priority to the first distributing state and the second distributing state.

The controller controls the target temperature by setting the target temperature of the object to be greater than the second temperature and less than the first temperature. In a case that the temperature of the object is greater than the second temperature and the less than the target temperature and the first temperature, the controller controls the driver to switch the first and second four-way valves to be in the first distributing state. According to the configuration, if the temperature of the object is less than the target temperature, the fluid having the first temperature is distributed to the channel of the object and thus the temperature of the object is raised closer to the target temperature. In a case that the temperature of the object is greater than the second temperature and the target temperature and less than the first temperature, the controller controls the driver to switch the first and second four-way valves to be in the second distributing state. According to the configuration, if the temperature of the object is greater than the target temperature, the fluid having the second temperature is distributed to the channel of the object and thus the temperature of the object is reduced closer to the target temperature. In a case that the temperature of the object is greater than the second temperature, less than the first temperature, and within the predefined temperature range including the target temperature, the controller controls the driver to switch the first and second four-way valves to be in the non-distributing state in priority to the first distributing state and the second distributing state. According to the configuration, if the temperature of the object is within the predefined temperature range including the target temperature, the fluid is not distributed to the channel of the object and thus the temperature of the object is maintained. Further, the distribution of the fluid to the channel of the object is not required to maintain the temperature of the object. In comparison to a configuration in which constant distribution of the fluid having the first temperature or the second temperature to the channel of the object is required, loads on the first adjustment device and the second adjustment device can be reduced and thus energy loss can be reduced.

In an eleventh aspect, each of the valve components further switches each of the first and second four-way valves to be in at least one of: a third state in which the first communication channel and the second communication channel communicate with the third region, the third communication channel communicates with the first region, and the fourth communication channel communicates with the second region; and a fourth state in which the first communication channel communicates with the second region, the second communication channel communicates with the third region, and the third communication channel and the fourth communication channel communicate with the first region. The driver further executes adjustment driving by rotating the valve component of the first four-way valve and the valve component of the second four-way valve such that the phases are shifted from each other by 90° in the predefined rotational direction and switches the first and second four-way valves to be in the third distributing state in which the four-way valve is in the third state and the second four-way valve is in the fourth state.

Each of the valve components further switches each of the first and second four-way valves to be in the third state in which the first communication channel and the second communication channel communicate with the third region, the third communication channel communicates with the first region, and the fourth communication channel communicates with the second region. According to the configuration, each of the four-way valve allows the distribution of the fluid to the object via the first communication channel, the first region, and the second communication channel and prohibits flow of the fluid from the object back to the adjustment device (the first adjustment device or the second adjustment device). Further, each of the valve components further switches each of the first and second four-way valves to be in the fourth state in which the first communication channel communicates with the second region, and the second communication channel communicates with the third region, and the third communication channel and the fourth communication channel communicate with the first region. According to the configuration, each of the four-way valve prohibits the distribution of the fluid to the object and returns the fluid from the object to the adjustment device via the third communication channel, the first region, and the fourth communication channel.

The driver executes adjustment driving by rotating the valve component of the first four-way valve and the valve component of the second four-way valve such that the phases are shifted from each other by 90° in the predefined rotational direction and switches the first and second four-way valves to be in the third distributing state in which the first four-way valve is in the third state and the second four-way valve is in the fourth state. According to the configuration, the fluid having the first temperature is distributed from the first adjustment device to the object via the first communication channel, the first region, and the second communication channel of the first four-way valve and returned from the object to the second adjustment device via the third communication channel, the first region, and the fourth communication channel of the second four-way valve. Therefore, if an amount of the fluid in the first adjustment device becomes greater than an amount of the fluid in the second adjustment device, the fluid is transferred from the first adjustment device to the second adjustment device. Namely, the amount of the fluid in the first adjustment device and the amount of the fluid in the second adjustment device can be adjusted closer to each other.

In a twelfth aspect, each of the valve components further switches each of the first and second four-way valves to be in at least one of: a third state in which the first communication channel and the second communication channel communicate with the third regions, the third communication channel communicates with the first region, and the fourth communication channel communicates with the second region; and a fourth state in which the first communication channel communicates with the second region, the second communication channel communicates with the third region, and the third communication channel and the fourth communication channel communicate with the first region. The driver further executes adjustment driving by rotating the valve component of the first four-way valve and the valve component of the second four-way valve such that the phases are shifted from with each other by 90° in the predefined rotational direction and switches the first and second four-way valves to be in a fourth distributing state in which the first four-way valve is in the fourth state and the second four-way valve is in the third state.

Similar to the eleventh aspect, each of the valve components further switches each of the first and second four-way valves to be in the third state or the fourth state. The driver further executes the adjustment driving by rotating the valve component of the first four-way valve and the valve component of the second four-way valve such that the phases are shifted from each other by 90° in the predefined rotational direction and switches the first and second four-way valves to be in the fourth distributing state in which the first four-way valve is in the fourth state and the second four-way valve is in the third state. According to the configuration, the fluid having the second temperature is distributed from the second adjustment device to the object via the first communication channel, the first region, and the second communication channel of the second four-way valve and returned from the object to the first adjustment device via the third communication channel, the first region, and the fourth communication channel of the first four-way valve. Therefore, if the amount of the fluid in the second adjustment device becomes greater than the amount of the fluid in the first adjustment device, the fluid is transferred from the second adjustment device to the first adjustment device. Namely, the amount of the fluid in the first adjustment device and the amount of the fluid in the second adjustment device can be adjusted closer to each other.

In a thirteenth aspect, the controller controls the driver to execute the adjustment driving in a case that the target temperature control is not performed. According to the configuration, the amount of the fluid in the first adjustment device and the amount of the fluid in the second adjustment device can be adjusted closer to each other without disturbing the target temperature control.

In a fourteenth aspect, the valve unit includes the driver that executes first adjustment driving by rotating the first four-way valve and the second four-way valve such that the phases are shifted from each other by 90° in the predefined rotational direction and switches the first and second four-way valves to be in the third distributing state in which the first four-way valve is in the third state and the second four-way valve is in the fourth state. The valve unit includes the driver that executes second adjustment driving by rotating the first four-way valve and the second four-way valve such that the phases are shifted from each other by 90° in the predefined rotational direction and switches the first and second four-way valves to be in a fourth distributing state in which the first four-way valve to the fourth state and the second four-way valve to the third state.

The temperature control system includes the valve unit (first valve unit) that executes the first adjustment driving to transfer the fluid from the first adjustment device to the second adjustment device and the valve unit (second valve unit) that executes the second adjustment driving to transfer the fluid from the second adjustment device to the first adjustment device. Therefore, even if the amount of the fluid in the first adjustment device becomes greater than the amount of the fluid in the second adjustment device, or if the amount of the fluid in the second adjustment device becomes greater than the amount of the fluid in the first adjustment device, the amount of the fluid in the first adjustment device and the amount of the fluid in the second adjustment device can be adjusted closer to each other.

BRIEF DESCRIPTION OF THE DRAWINGS

The above and other objects, features, and advantages of the present disclosure will be apparent from the following detailed description made with reference to the accompanying drawings.

DETAILED DESCRIPTION OF EMBODIMENTS

Embodiments, which includes a temperature control system configured to control a temperature of a work support (an object to be controlled) in a processing device, will be described with reference to the drawings.

Figure 1:
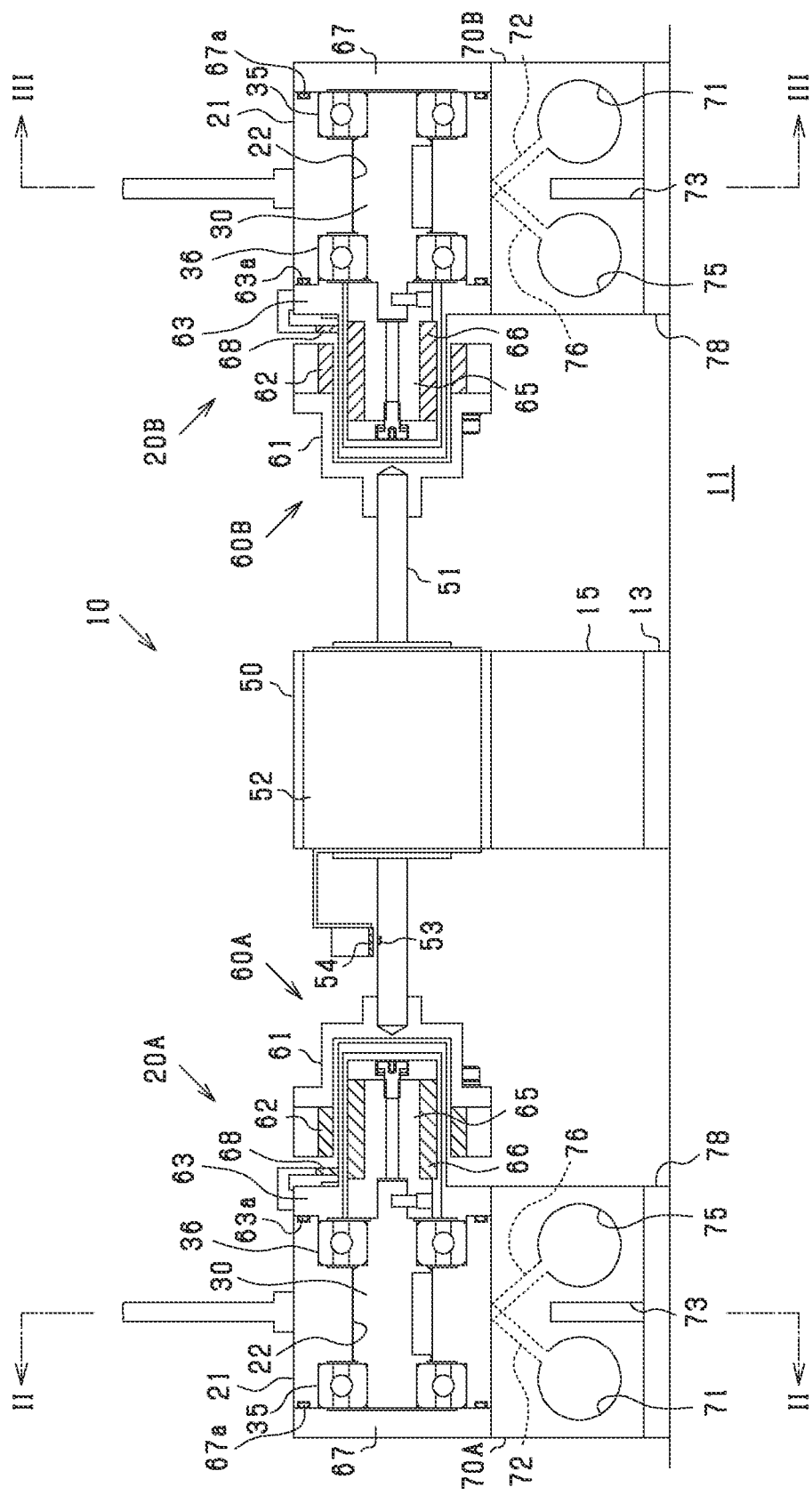
FIG. 1 is a partial cross-sectional view of a valve unit.

FIG. 1 illustrates a partial cross section of one of valve units in the temperature control system. A valve unit 10 includes a first four-way valve 20A, a second four-way valve 20B, a motor 50, a first magnet coupling 60A, and a second magnet coupling 60B.

The motor 50 (a driver) is supported by a support plate 11 (a support member) via a block 15 (a spacer) and a heat insulator 13. The motor 50 may be a dual shaft servo motor or stepping motor including a rotary shaft 51 projecting from either side of a body 52. A magnet 53 is fixed to a periphery of the rotary shaft at a predefined position. A magnetic sensor 54 is fixed to the motor 50 to detect magnetic quantities when the magnet 53 that rotates with the rotary shaft 51 is at a point of origin (a reference rotational position). That is, the magnetic sensor 54 detects the point of origin of the motor 50. The motor 50 is controlled by a controller 80 (see FIG. 4). Detection signals from the magnetic sensor 54 are input to the controller 80. An alternative to the magnetic sensor 54 fixed to the rotary shaft 51 at the predefined position may be magnetization of a portion of the rotary shaft at the predefined position.

The first four-way valve 20A is supported by the support plate 11 via a first flow channel block 70A and a heat insulator 78. The first four-way valve 20A includes a body 21, a valve component 30, and bearings 35 and 36.

Figure 2:
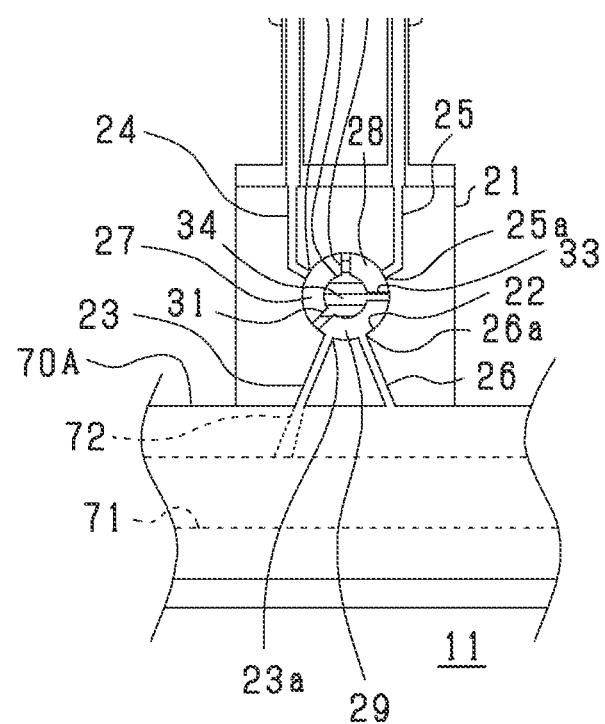
FIG. 2 is a cross-sectional view along line II-II in FIG. 1.

The body 21 may be made of metal and formed in a cuboid. The body 21 includes a valve chamber 22 having a columnar cavity. FIG. 2 illustrates a cross section along line II-II in FIG. 1. The body 21 includes a first communication channel 23, a second communication channel 24, a third communication channel 25, and a fourth communication channel 26 that allow the valve chamber 22 to communicate with the outside of the body 21. The first communication channel 23, the second communication channel 24, the third communication channel 25, and the fourth communication channel 26 are arranged in a clockwise direction (in a predefined rotational direction) about a center axis of the valve chamber 22 to communicate with the valve chamber 22 at arranged positions, respectively. The first communication channel 23, the second communication channel 24, the third communication channel 25, and the fourth communication channel 26 communicate with the valve chamber 22 at a first position 23a, a second position 24a, a third position 25a, and a fourth position 26a that are arranged in the clockwise direction. That is, the first position 23a, the second position 24a, the third position 25a, and the fourth position 26a are arranged in the clockwise direction that is one of circumferential direction of the valve chamber 22.

The valve component 30 that extends in an axial direction of the valve chamber 22 is held in the valve chamber 22. The valve component 30 includes a center portion 34, a first dividing portion (or first divider) 31, a second dividing portion (or second divider) 32, and a third dividing portion (or third divider) 33. The center portion 34 has a columnar shape and extends in the axial direction of the valve chamber 22. Each of the first dividing portion 31, the second dividing portion 32, and the third dividing portion 33 has a planar shape (a plate shape) extending from the center portion 34 in a radial direction of the valve chamber 22. The center portion 34 is rotatably supported by the bearings 35 and 36 such that the center portion 34 can rotate in the clockwise direction and in the counterclockwise direction about the center axis of the valve chamber 22.

The first dividing portion 31, the second dividing portion 32, and the third dividing portion 33 are arranged in the clockwise direction to divide the valve chamber 22 in the clockwise direction. Inner walls of the first dividing portion 31, the second dividing portion 32, and an inner wall of the valve chamber 22 define a first region 27. The second dividing portion 32, the third dividing portion 33, and the inner wall of the valve chamber 22 define a second region 28. The third dividing portion 33, the first dividing portion 31, and the inner wall of the valve chamber 22 define a third region 29. That is, the valve component 30 divides the valve chamber 22 into the first region 27, the second region 28, and third region 29 that are arranged in the clockwise direction.

An angular distance between the first position 23a and the second position 24a with the center axis of the valve chamber 22 as a center and an angular distance between the third position 25a and the fourth position 26a with the center axis of the valve chamber 22 as a center are 97.5°. An angular distance between the second position 24a and the third position 25a with the center axis of the valve chamber 22 as a center is 120°. An angular distance between the fourth position 26a and the first position 23a with the center axis of the valve chamber 22 as a center is 45°. An angular distance between the first dividing portion 31 and the second dividing portion 32 with the center axis of the valve chamber 22 as a center and an angular distance between the third dividing portion 33 and the first dividing portion 31 with the center axis of the valve chamber 22 as a center are 135°. An angular distance between the second dividing portion 32 and the third dividing portion 33 with the center axis of the valve chamber 22 as a center are 90°.

Namely, in the clockwise direction about the center axis of the valve chamber 22, the distance (the angular distance) between the first dividing portion 31 and the second dividing portion 32 is greater than the distance between the first position 23a and the second position 24a, less than the distance between the first position 23a and the third position 25a, and less than the distance between the fourth position 26a and the second position 24a. In the clockwise direction about the center axis of the valve chamber 22, the distance between the second dividing portion 32 and the third dividing portion 33 is less than the distance between the second position 24a and the third position 25a. In the clockwise direction about the center axis of the valve chamber 22, the distance between the third dividing portion 33 and the first dividing portion 31 is greater than the distance between the third position 25a and the fourth position 26a, greater than the distance between the fourth position 26a and the first position 23a, less than the distance between the third position 25a and the first position 23a, and less than the distance between the second position 24a and the fourth position 26a.

A first end of the rotary shaft 51 of the motor 50 is coupled to the valve component 30 of the first four-way valve 20A via the first magnet coupling 60A. The first magnet coupling 60A includes an outer peripheral member 61, outer peripheral magnets 62, an inner peripheral member 65, and an inner peripheral magnet 66.

The outer peripheral member 61 has a cylindrical shape with a bottom. The outer peripheral member 61 is coupled to the rotary shaft 51. The outer peripheral member 61 rotates about the rotary shaft 51 together with the rotary shaft 51. The outer peripheral magnets 62 are fixed to an inner peripheral edge portion of the outer peripheral member 61. Each of the outer peripheral magnets 62 formed in an arc shape has an N pole on an outer peripheral side and an S pole on an inner peripheral side. The outer peripheral magnets 62 are disposed such that the polarities alternate in a circumferential direction of the outer peripheral member 61.

The inner peripheral member 65 has a columnar shape. The inner peripheral member 65 is coupled to the valve component 30. The inner peripheral member 65 rotates about the center portion 34 of the valve component 30 together with the valve component 30. The inner peripheral magnets 66 are fixed to an outer peripheral edge portion of the inner peripheral member 65. The number of the inner peripheral magnets 66 is equal to the number of the outer peripheral magnets 62 Each of the inner peripheral magnets 66 formed in an arc shape has an N pole on an outer peripheral side and an S pole on an inner peripheral side. The inner peripheral magnets 66 are disposed such that the polarities alternate in the circumferential direction of the outer peripheral member 61.

The outer peripheral magnets 62 are opposed to the inner peripheral magnets 66, respectively, via a permeable portion 63 of the body 21 of the first four-way valve 20A. Space is provided between the outer peripheral magnets 62 and the permeable portion 63, that is, the outer peripheral magnets 62 do not touch the permeable portion 63. The permeable portion 63 is made of a non-magnetic material and thus permeable to magnetism. Therefore, the outer peripheral magnets 62 and the inner peripheral magnets 66 attract each other. The outer peripheral member 61 and the inner peripheral member 65 are magnetically coupled to each other to allow torque transmission. Namely, the first magnet coupling 60A enables non-contact torque transmission between the valve component 30 of the first four-way valve 20A and the motor 50.

A magnetic sensor 68 is fixed to the first four-way valve 20A to detect magnetic quantities regarding the inner peripheral magnets 66 rotating with the inner peripheral member 65. Namely, the magnetic sensor 68 detects rotational positions of the inner peripheral member 65 and the valve component 30. Detection signals from the magnetic sensor 68 are input to the controller 80.

A gap between the body 21 of the first four-way valve 20A and the permeable portion 63 is sealed with a sealing member 63a. A gap between the body 21 of the first four-way valve 20A and a lid 67 is sealed with a sealing member 67a. According to the configuration, an internal space defined by the body 21, the permeable portion 63, and the lid 67 are sealed except for the first communication channel 23, the second communication channel 24, the third communication channel 25, and the fourth communication channel 26. The sealing members 63a and 67a do not contact rotary members such as the valve component 30, the inner peripheral member 65, and the inner peripheral magnets 66. Namely, the sealing members 63a and 67a do not rub against other members.

The first flow channel block 70A is made of metal and formed in a cuboid (a quadrangular prism shape). A longitudinal direction of the first flow channel block 60A is along the horizontal direction and perpendicular to the rotary axis 51 of the motor 50. The first flow channel block 70A includes a main outward channel 71 that extends in the longitudinal direction of the first flow channel block 70A. The main outward channel 71 is a columnar space in the first flow channel block 70A. The first flow channel block 70A includes a main return channel 75 that extends in the longitudinal direction of the first flow channel block 70A. The main return channel 75 defines a cylindrical space inside the first flow channel block 70A. The main outward channel 71 and the main return channel 75 are parallel to each other. The first flow channel block 70A includes a groove 73 between the main outward channel 71 and the main return channel 75. According to the configuration, heat is less likely to be transmitted between the fluid flowing through the main outward channel 71 and the fluid flowing through the main return channel 75 via the first flow channel block 70A. The first flow channel block 70A includes a connecting channel 72 that connect the main outward channel 71 to the first communication channel 23 of the first four-way valve 20A. The first flow channel block 70A includes the main return channel 75 and a connecting channel 76 that connect the main outward channel 71 to the fourth communication channel 26 of the first four-way valve 20A.

Figure 3:
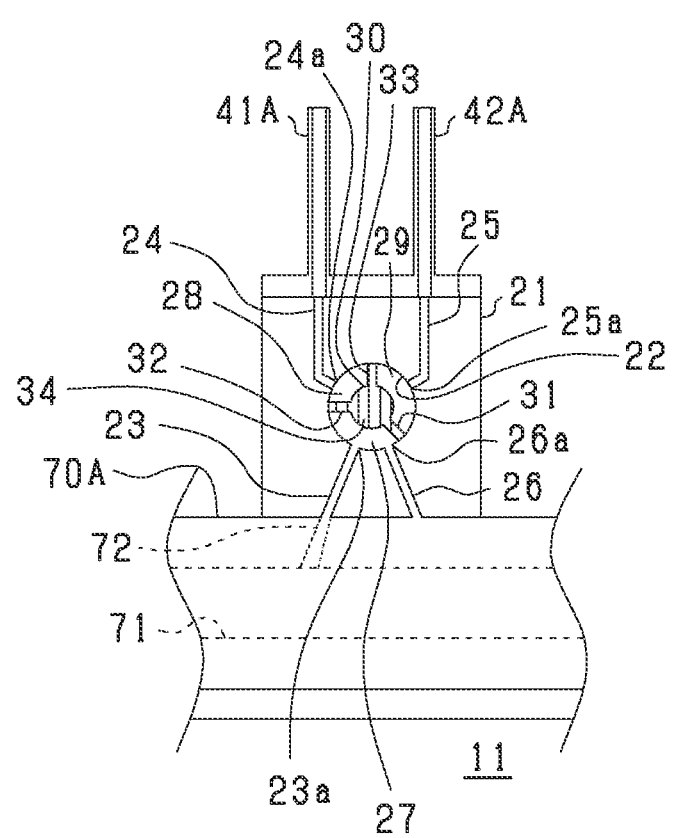
FIG. 3 is a cross-sectional view along line III-III in FIG. 1.

A second end of the rotary shaft 51 of the motor 50 on an opposite side of the first four-way valve 20A is coupled to the valve component 30 of the second four-way valve 20B via the second magnet coupling 60B. The second four-way valve has a configuration similar to the configuration of the first four-way valve 20A and the second magnet coupling 60B has a configuration similar to the configuration of the first magnet coupling 60A. The second four-way valve 20B is supported by the support plate 11 via a second flow channel block 70B that has a configuration similar to the configuration of the first flow channel block 70A and a heat insulator 78. Namely, the first flow channel block 70A and the second flow channel block 70B are supported by the same support plate 11 and the heat insulators 78 are disposed between the support plate 11 and the first flow channel block 70A and between the support plate 11 and the second flow channel block 70B. FIG. 3 illustrates a cross section along line III-III in FIG. 1.

With the clockwise direction as a positive direction, the valve component 30 of the second four-way valve 20B is −90° out of phase with the valve component 30 of the first four-way valve 20A. In other words, with the clockwise direction as the positive direction, the valve component 30 of the first four-way valve 20A is +90° out of phase with the valve component 30 of the second four-way valve 20B.

Figure 4:
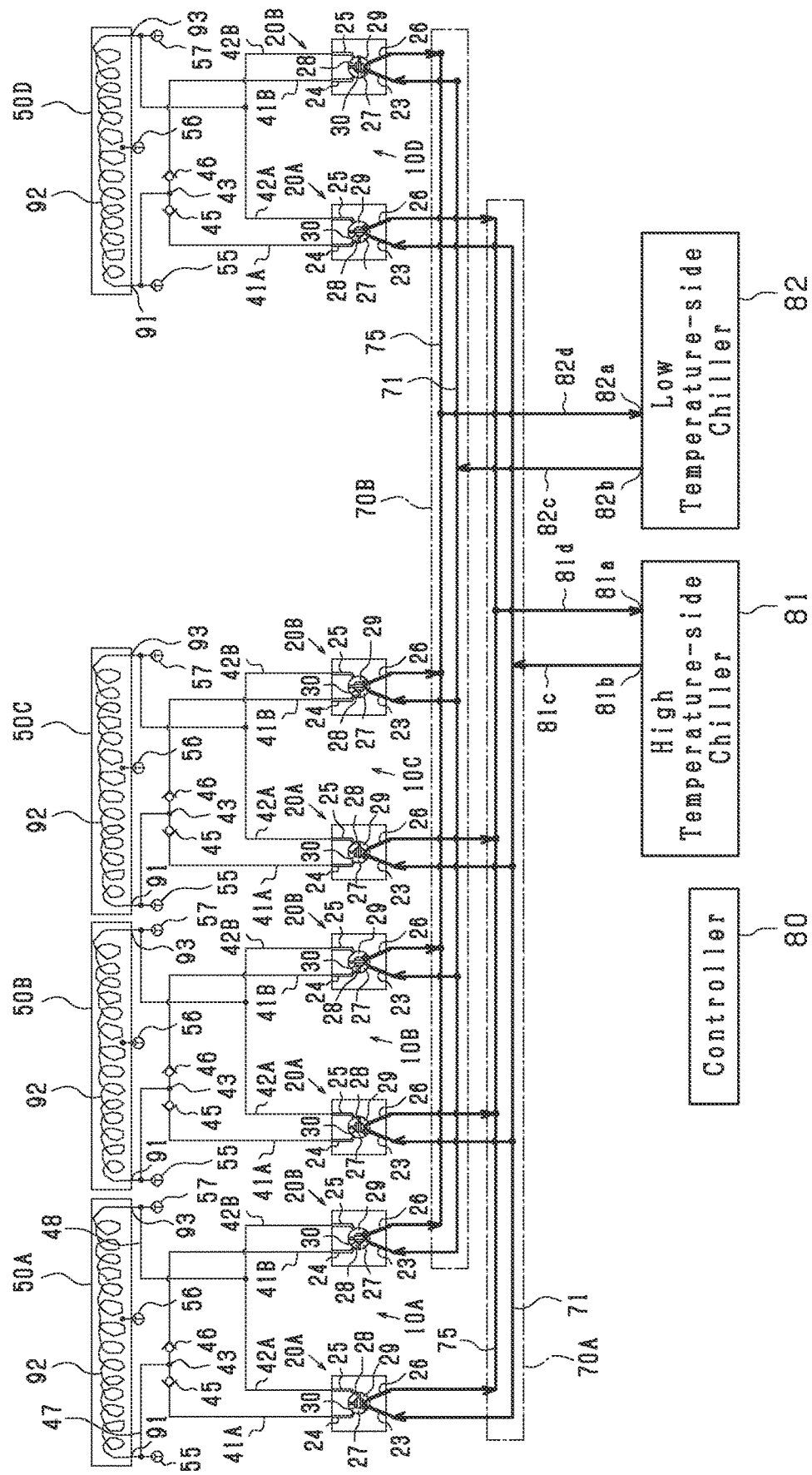
FIG. 4 is a schematic view of a temperature control system.

FIG. 4 illustrates a schematic view of the temperature control system. The temperature control system includes a high temperature-side chiller 81, a low temperature-side chiller 82, the first flow channel block 70A, the second flow channel block 70B, a first valve unit 10A, a second valve unit 10B, a third valve unit 10C, a fourth valve unit 10D, a first work support 50A, a second work support 50B, a third work support 50C, and a fourth work support 50D. The first valve unit 10A, a second valve unit 10B, a third valve unit 10C, a fourth valve unit 10D are specific examples of the valve unit 10. Each of the first valve unit 10A, the second valve unit 10B, the third valve unit 10C, and the fourth valve unit 10D is provided as the valve unit 10. Each of the first work support 50A, the second work support 50B, the third work support 50C, and the fourth work support 50D is provided as the work support.

The high temperature-side chiller 81 (a first adjustment device) may be a known fluid circulator that includes a tank, a heat exchanger, and a pump. The fluid may be a fluorine-based inert fluid. The high temperature-side chiller 81 includes a first intake port 81a and a first discharge port 81b. The high temperature-side chiller 81 takes the fluid therein through the first intake port 81a, adjusts the temperature to a higher temperature (for example, 180° C., a first temperature), and discharges the fluid through the first discharge port 81b. The first discharge port 81b is coupled to the main outward channel 71 of the first flow channel block 70A via a channel 81c. The first intake port 81a is coupled to the main return channel 75 of the first flow channel block 70A via a channel 81d. Namely, the first flow channel block 70A defines at least a part of a channel between the first discharge port 81b and the first communication channel 23 of each first four-way valve 20A and at least a part of a channel between the fourth communication channel 26 of each first four-way valve and the first intake port 81a.

The low temperature-side chiller 82 (a second adjustment device) may be a known circulator that includes a tank, a heat exchanger, and a pump. The fluid may be a fluorine-based inert fluid. The low temperature-side chiller 82 includes a second intake port 82a and a second discharge port 82b. The low temperature-side chiller 82 takes the fluid therein through the second intake port 82a, adjusts the temperature to a lower temperature (for example, 0° C., a second temperature), and discharges the fluid through the second discharge port 82b. The second discharge port 82b is coupled to the main outward channel 71 of the second flow channel block via a channel 82c. The second intake port 82a is coupled to the main return channel 75 of the second flow channel block 70B via a channel 82d. Namely, the second flow channel block 70B, which is spaced apart from the first flow channel block 70A, defines at least a part of a channel between the second discharge port 82b and the first communication channel 23 of each second four-way valve 20B and at least a part of a channel between the fourth communication channel 26 of each second four-way valve 20B and the second intake port 82a.

The second communication channels 24 of the first four-way valves 20A in the valve units 10A to 10D are coupled to first ducts 41A, respectively. The second communication channels 24 of the second four-way valves 20B in the valve units 10A to 10D are coupled to second ducts 41B, which are different from the first ducts 41A, respectively. In the valve units 10A to 10D, the first ducts 41A and the second ducts 41B are coupled at joins 43. The first ducts 41A include first check valves 45 that allow distribution of the fluids from the second communication channels 24 of the respective first four-way valves 20A to the joins 43 and prohibit distribution of the fluids from the joins 43 to the second communication channels 24 of the respective first four-way valves 20A. The second ducts 41B include second check valves 46 that allow distribution of the fluids from the second communication channels 24 of the respective second four-way valves 20B to the joins 43 and prohibit distribution of the fluids from the joins 43 to the second communication channels 24 of the respective second four-way valves 20B.

The joins 43 are coupled to inlets 91 of the work supports 50A to 50D via the respective ducts 47. The work supports 50A to 50D form parts or a whole of the work supports that support works. The work supports 50A to 50D include flow channels 92 therein, respectively. The fluids flow into the flow channels 92 through the inlets 91, through the flow channels 92, and out of the flow channels 92 through outlets 93. First temperature sensors 55, second temperature sensors 56, and third temperature sensors 57 are fixed to the work supports 50A to 50D. The first temperature sensors 55 detect temperatures of the fluids that flow into the inlets 91. The second temperature sensors 56 detect temperatures of the fluids that flow through middle portions of the flow channels 92. The third temperature sensors 57 detect temperatures of the fluids that flow out of the outlets 93. Detection signals from the temperature sensors 55 to 57 are input to the controller 80.

The outlets 93 of the work supports 50A to 50D are coupled to ducts 48, respectively. The third communication channels 25 of the first four-way valves 20A in the valve units 10A to 10D are coupled to ducts 42A, respectively. The third communication channels 25 of the second four-way valves 20B in the valve units 10A to 10D are coupled to ducts 42B, respectively. The ducts 42A and the ducts 42B are coupled to the ducts 48.

As described above, in the first four-way valves 20A, the first communication channels 23 are coupled to the first discharge port 81*b* of the high temperature-side chiller 81 via the flow channels, the second communication channels 24 are coupled to the inlets 91 of the work supports 50A to 50D via the flow channels, the third communication channels 25 are coupled to the outlets 93 of the work supports 50A to 50D via the flow channels, and the fourth communication channels 26 are coupled to the first inlet port 81*a* of the high temperature-side chiller 81 via the flow channels. In the second four-way valves 20B, the first communication channels 23 are coupled to the second discharge port 82*b* of the low temperature-side chiller 82 via the flow channels, the second communication channels 24 are coupled to the inlets 91 of the work supports 50A to 50D via the flow channels, the third communication channels 25 are coupled to the outlets 93 of the work supports 50A to via the flow channels, and the fourth communication channels 26 are coupled to the second inlet port 82*a* of the low temperature-side chiller 82 via the flow channels.

Figure 5:
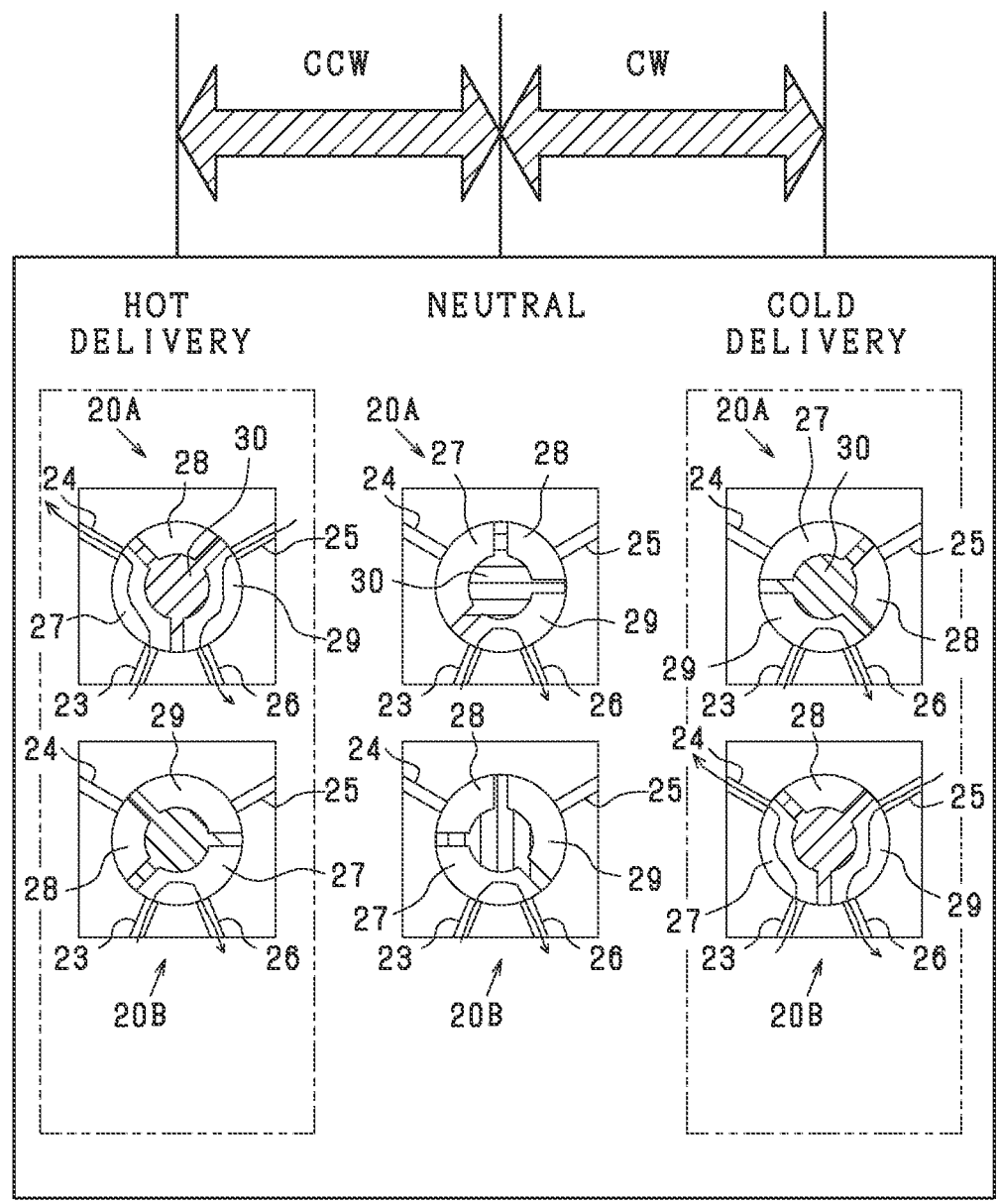
FIG. 5 is a schematic view illustrating a relation between states of a valve component and fluid delivery.

FIG. 5 schematically illustrates a relation between states of the valve component 30 in each of the first four-way valves 20A and the second four-way valves and fluid delivery. With the clockwise (CW) direction as a positive direction, the valve component 30 in the second four-way valve 20B is −90° out of phase with the valve component 30 in the first four-way valve 20A. The valve units 10A to 10C illustrated in FIG. 4 have the above configuration.

In the NEUTRAL state (non-distributing state), the valve component 30 in the first four-way valve 20A allows the second communication channel 24 to communicate with the first region 27, the third communication channel 25 to communicate with the second region 28, and the fourth communication channel 26 and the first communication channel 23 to communicate with the third region 29 (a second state). As illustrated in FIG. 4, the high temperature fluid delivered from the main outward channel 71 of the first flow channel block 70A to the first communication channel 23 of the first four-way valve 20A in each of the valve unit to 10C is discharged to the main return channel 75 of the first flow channel block via the third region 29 and the fourth communication channel 26.

In the NEUTRAL state, the valve component 30 in the second four-way valve 20B allows the second communication channel 24 to communicate with the second region 28, the third communication channel 25 to communicate with the third region 29, and the fourth communication channel 26 and the first communication channel 23 to communicate with the first region 27 (a second state). As illustrated in FIG. 4, the low temperature fluid delivered from the main outward channel 71 of the second flow channel block 70B to the first communication channel 23 of the second four-way valve 20B in each of the valve unit 10A to 10C is discharged to the main return channel 75 of the second flow channel block 70B via the first region 27 and the fourth communication channel 26.

Figure 9:
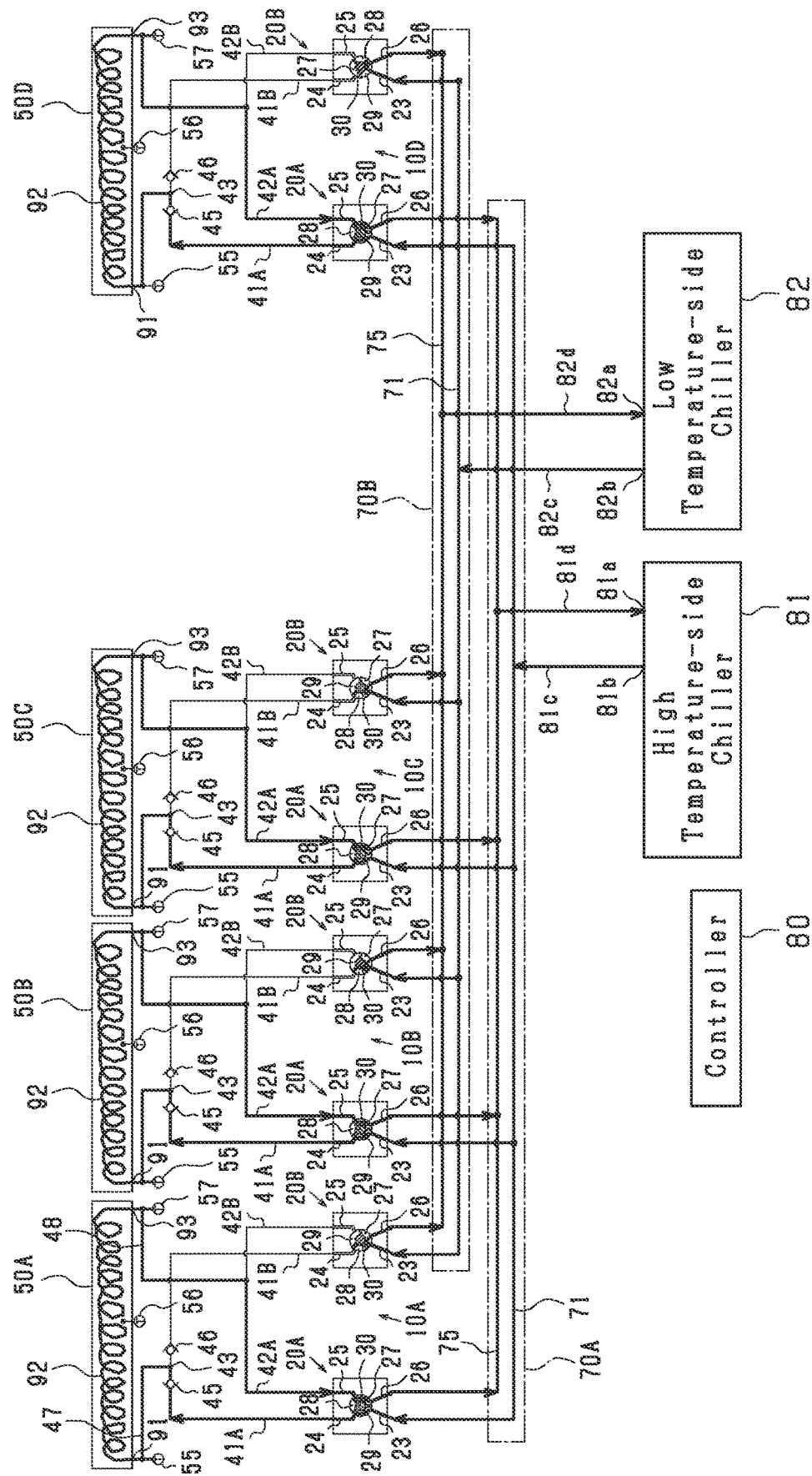
FIG. 9 is a schematic view of one or more embodiments illustrating delivery of a high temperature fluid.

By rotating the valve component 30 in the counterclockwise direction by from the NEUTRAL state, the state is switched to the HOT delivery state. In the HOT delivery state (a first distributing state), the valve component 30 in the first four-way valve 20A allows the first communication channel 23 and the second communication channel 24 to communicate with the first region 27, and the third communication channel 25 and the fourth communication channel 26 to communicate with the third region 29 (a first state). As illustrated in FIG. 9, the high temperature fluid delivered from the main outward channel 71 of the first flow channel block 70A to the first communication channel 23 of the first four-way valve 20A in each of the valve unit 10A to 10C is delivered to the first duct 41A via the first region 27 and the second communication channel 24. The high temperature fluid delivered to the first duct 41A is delivered to the inlet 91 of each of the work supports 50A to 50C via the first check valve 45, the join 43, and the duct 47. The high temperature fluid delivered to the inlet 91 of each of the work supports 50A to 50C flows through the flow channel 92 and out of the outlet 93. The high temperature fluid discharged from the outlet 93 of each of the work supports 50A to 50C flows into the third communication channel 25 of the first four-way valve 20A in each of the valve units 10A to 10C via the duct 48 and the duct 42A. The high temperature fluid in the third communication channel 25 of the first four-way valve 20A in each of the valve units 10A to 10C is discharged to the main return channel 75 via the third region 29 and the fourth communication channel 26.

In the HOT delivery state, the valve component 30 of the second four-way valve 20B allows the second communication channel 24 to communicate with the second region 28, the third communication channel 25 to communicate with the third region 29, and the fourth communication channel 26 and the first communication channel 23 to communicate with the first region 27 (a second state). As illustrated in FIG. 9, the low temperature fluid delivered from the main outward channel 71 of the second flow channel block 70B to the first communication channel 23 of the second four-way valve 20B in each of the valve units 10A to 10C is discharged to the main return channel 75 of the second flow channel block 70B via the first region 27 and the fourth communication channel 26.

Figure 10:
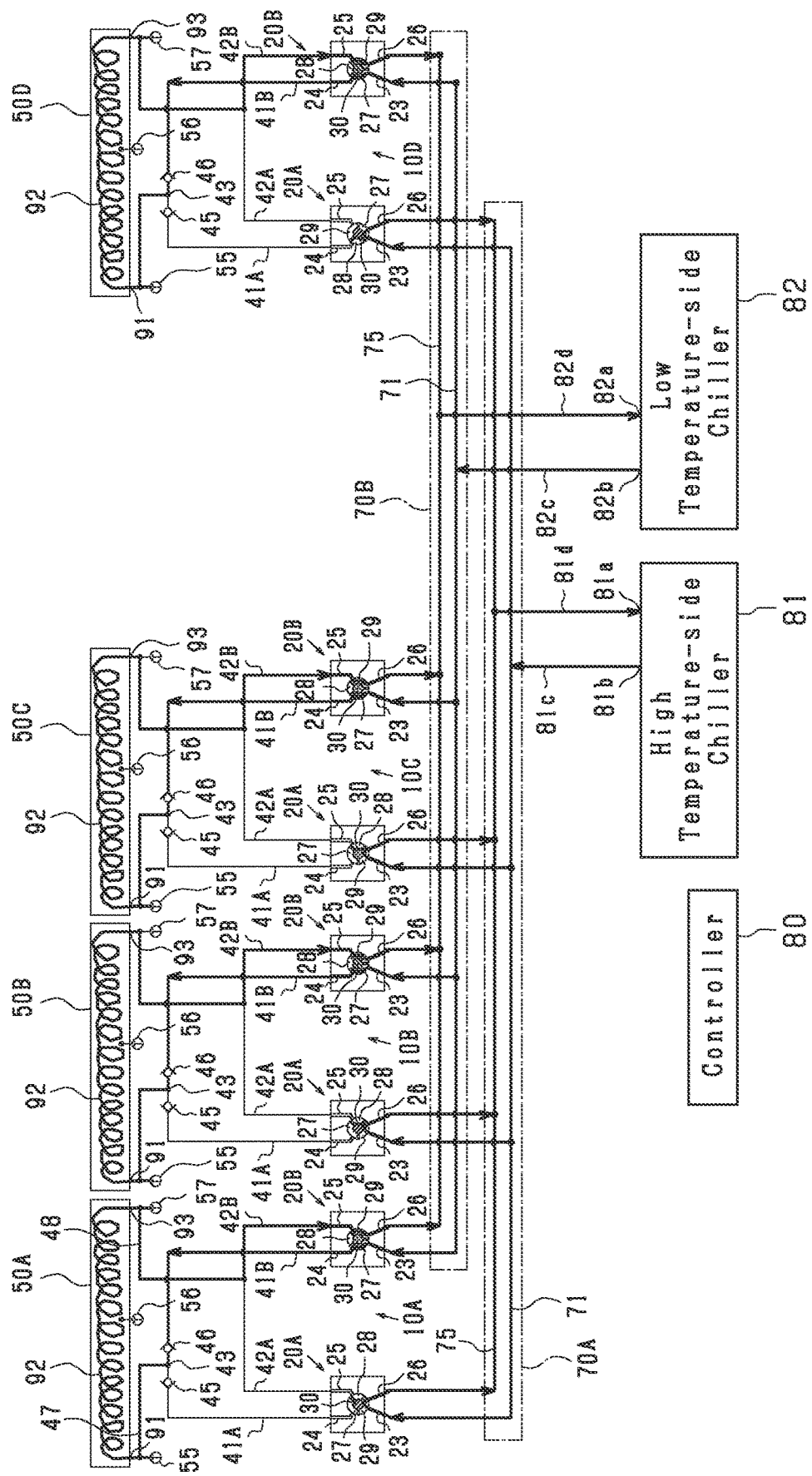
FIG. 10 is a schematic view of one or more embodiments illustrating delivery of a low temperature fluid.

By rotating the valve component 30 in the clockwise direction by 45° from the NEUTRAL state, the state is switched to the COLD delivery state. In the COLD delivery state (a first distributing state), the valve component 30 in the first four-way valve 20A allows the second communication channel 24 to communicate with the first region 27, the third communication channel 25 to communicate with the second region 28, and the fourth communication channel 26 and the first communication channel 23 to communicate with the third region 29 (a second state). As illustrated in FIG. 10, the high temperature fluid delivered from the main outward channel 71 of the first flow channel block 70A to the first communication channel 23 of the first four-way valve 20A in each of the valve unit 10A to 10C is discharged to the main return channel 75 of the first flow channel block 70A via the third region 29 and the fourth communication channel 26.

In the COLD delivery state, the valve component 30 of the second four-way valve 20B allows the first communication channel 23 and the second communication channel 24 to communicate with the first region 27, and the third communication channel 25 and the fourth communication channel 26 to communicate with the third region 29 (a first state). As illustrated in FIG. 10, the low temperature fluid delivered from the main outward channel 71 of the second flow channel block 70B to the first communication channel 23 of the second four-way valve 20B in each of the valve units 10A to 10C is delivered to the second duct 41B via the first region 27 and the second communication channel 24. The low temperature fluid delivered to the second duct 41B is delivered to the inlet 91 of each of the work supports 50A to 50C via the second check valve 46, the join 43, and the duct 47. The low temperature fluid delivered to the inlet 91 of each of the work supports 50A to 50C flows through the flow channel 92 and out of the outlet 93. The low temperature fluid discharged from the outlet 93 of each of the work supports 50A to 50C flows into the third communication channel 25 of the second four-way valve 20B in each of the valve units 10A to 10C via the duct 48 and the duct 42B. The low temperature fluid in the third communication channel 25 of the second four-way valve 20B in each of the valve units 10A to 10C is discharged to the main return channel 75 of the second flow channel block 70B via the third region 29 and the fourth communication channel 26.

Figure 6:
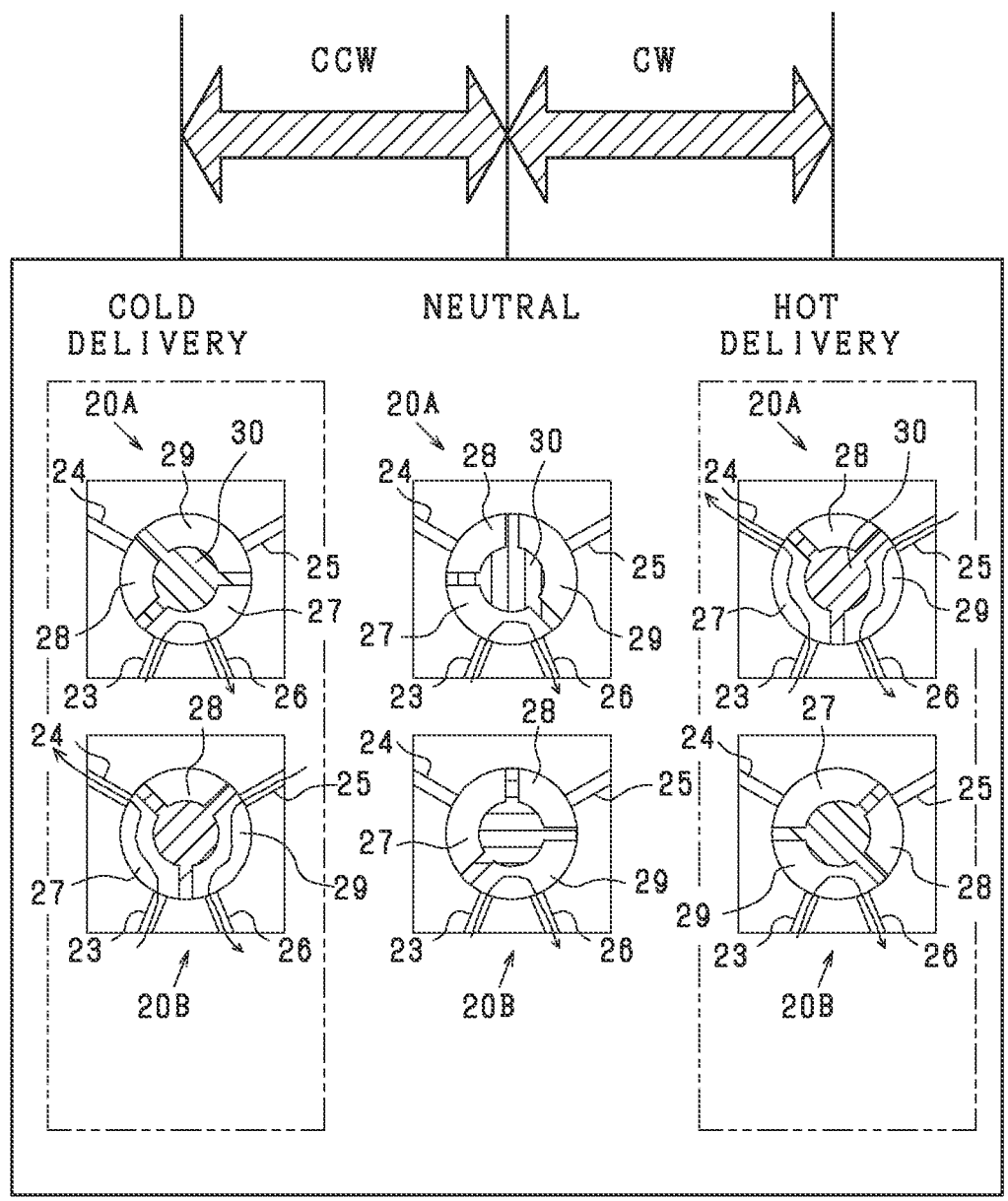
FIG. 6 is a schematic view illustrating a relation between states of a valve component and fluid delivery.

FIG. 6 schematically illustrates a relation between states of the valve component 30 in each of the first four-way valves 20A and the second four-way valves and fluid delivery. With the clockwise direction as a positive direction, the valve component 30 of the second four-way valve 20B is +90° out of phase with the valve component 30 of the first four-way valve 20A. The fourth valve unit 10D illustrated in FIG. 4 has the above configuration.

A position of the valve component 30 of the first four-way valve 20A in the NEUTRAL state in FIG. 6 and a position of the valve component 30 of the first four-way valve 20A in the NEUTRAL state in FIG. 5 are bilaterally symmetric. According to the configuration, the first four-way valve 20A in the NEUTRAL state in FIG. 6 and the first four-way valve 20A in the NEUTRAL state in FIG. 5 control the high temperature fluids in similar manners. A position of the valve component of the second four-way valve 20B in the NEUTRAL state in FIG. 6 and a position of the valve component 30 of the second four-way valve 20B in the NEUTRAL state in FIG. 5 are bilaterally symmetric. According to the configuration, the second four-way valve 20B in the NEUTRAL state in FIG. 6 and the second four-way valve 20B in the NEUTRAL state in FIG. 5 control the low temperature fluids in similar manners.

By rotating the valve component 30 in the clockwise direction by 45° from the NEUTRAL state in FIG. 6, the state is switched to the HOT delivery state. A position of the valve component 30 of the first four-way valve 20A in the HOT delivery state in FIG. 6 and a position of the valve component 30 of the first four-way valve 20A in the HOT delivery state in FIG. 5 are the same. According to the configuration, the first four-way valve 20A in the HOT delivery state in FIG. 6 and the first four-way valve 20A in the HOT delivery state in FIG. 5 control the high temperature fluids in similar manners. A position of the valve component 30 of the second four-way valve 20B in the HOT delivery state in FIG. 6 and a position of the valve component 30 of the second four-way valve 20B in the HOT delivery state in FIG. 5 are bilaterally symmetric. According to the configuration, the second four-way valve 20 in the HOT delivery state in FIG. 6 and the second four-way valve 20B in the HOT delivery state in FIG. 5 control the low temperature fluids in similar manners.

By rotating the valve component 30 in the counterclockwise direction by 45° from the NEUTRAL state in FIG. 6, the state is switched to the COLD delivery state. A position of the valve component 30 of the first four-way valve 20A in the COLD delivery state in FIG. 6 and a position of the valve component 30 of the first four-way valve 20A in the COLD delivery state in FIG. 5 are bilaterally symmetric. According to the configuration, the first four-way valve 20A in the COLD delivery state in FIG. 6 and the first four-way valve 20A in the COLD delivery state in FIG. 5 control the high temperature fluids in similar manners. A position of the valve component 30 of the second four-way valve 20B in the COLD delivery state in FIG. 6 and a position of the valve component 30 of the second four-way valve 20B in the COLD delivery state in FIG. 5 are the same. According to the configuration, the second four-way valve 20B in the COLD delivery state in FIG. 6 and the second four-way valve 20B in the COLD delivery state in FIG. 5 control the low temperature fluids in similar manners.

The controller 80 may be a microcomputer that includes a central processing unit (CPU), a read only memory (ROM), a random access memory (RAM), an input-output interface, and a driver circuit. The controller 80 controls driving of the motors 50 in the valve units 10A to 10D to control the temperatures of the middle portions of the flow channels 92 of the work supports 50A to 50D based on the detection signals from the second temperature sensors 56 of the work supports 50A to 50D and the detection signals from the magnetic sensors 54 and 68 (target temperature control).

Specifically, the controller 80 sets the target temperature of the middle portions of the flow channels 92 of the work supports 50A to 50D in a range greater than 0° C. (a second temperature) and less than 180° C. (a first temperature) based on set temperatures of surfaces of the work supports 50A to 50D set by a user, for example. The target temperature may be set based on differences between temperatures of the surfaces of the work supports 50A to 50D and temperatures of the middle portions of the flow channels 92 of the work supports 50A to 50D.

When the temperatures detected by the second temperature sensors 56 of the work supports 50A to 50D (the temperatures of the work supports 50A to 50D) are greater than 0° C. and less than the target temperature and 180° C., the controller controls the motors 50 in the valve units 10A to 10D to rotate the valve components such that the state is switched to the HOT delivery state (the first distributing state). When the temperatures detected by the second temperature sensors 56 of the work supports 50A to 50D (the temperatures of the work supports 50A to 50D) are greater than 0° C. and the target temperature and less than 180° C., the controller 80 controls the motors 50 in the valve units 10A to 10D to rotate the valve components 30 such that the state is switched to the COLD delivery state (the second distributing state). When the temperatures detected by the second temperature sensors 56 of the work supports 50A to 50D (the temperatures of the work supports 50A to 50D) are greater than 0° C. and less than 180° C. and within a predefined range including the target temperature, the controller 80 controls the motors 50 in the valve units 10A to 10D to rotate the valve components 30 such that the state is switched to the NEUTRAL state (the non-distributing state) in priority to the HOT delivery state and the COLD delivery state. The predefined temperature range may be a temperature range that is ±5° C. of the target temperature and considered that the temperatures detected by the second temperature sensors 56 are about the same.

Temperatures detected by the first temperature sensors 55 of the work supports 50A to 50D or temperatures detected by the third temperature sensors 57 may be used for the temperatures of the work supports 50A to 50D. The controller 80 may be configured to execute hysteresis control for the predefined temperature range. The controller 80 may be configured to execute variable setting for temperatures and flow volumes of the fluid discharged by the high temperature-side chiller 81 and temperatures and flow volumes of the fluid discharged by the low temperature-side chiller 82.

When the target temperature control described above is performed, a difference may be created between a fluid level of the fluid reserved in the tank of the high temperature-side chiller 81 and a fluid level of the fluid reserved in the tank of the low temperature-side chiller 82. The controller 80 executes fluid level adjustment in which the fluid is transferred between the high temperature-side chiller 81 and the low temperature-side chiller 82 when the target temperature control is not performed, for example, during startup of the temperature control system, before performance of the target temperature control, after the performance of the target temperature control, and during shutdown of the temperature control system.

Figure 7:
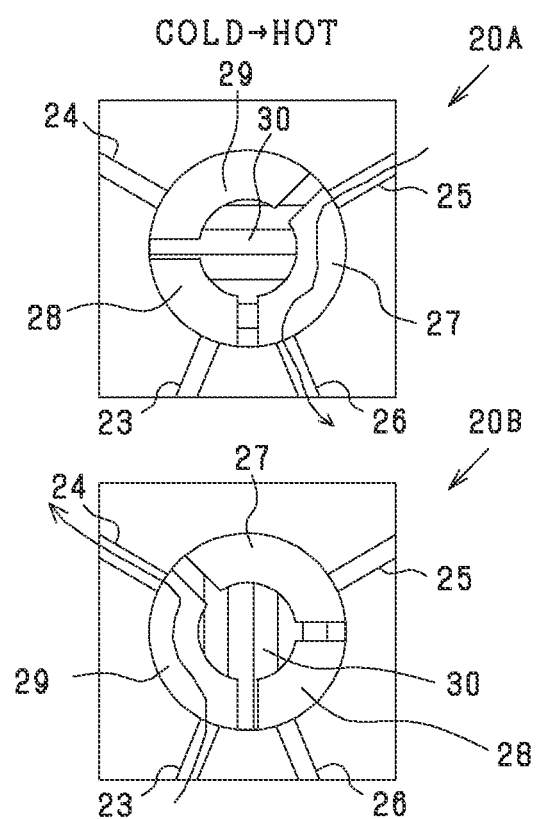
FIG. 7 is a schematic view illustrating a state of the valve component during fluid-level control.

FIG. 7 schematically illustrates a state of the valve components 30 of the first four-way valve 20A and the second four-way valve 20B during COLD-to-HOT control (fluid-level control, second adjustment driving) to transfer the fluid from the low temperature-side chiller 82 to the high temperature-side chiller 81.

By rotating the valve component 30 in the clockwise direction by 180° from the NEUTRAL state in FIG. 5, the state is switched to the COLD-to-HOT control state. In the COLD-to-HOT control state, the valve component 30 of the second four-way valve 20B allows the first communication channel 23 and the second communication channel 24 to communicate with the third region 29, the third communication channel 25 to communicate with the first region 27, and the fourth communication channel 26 to communicate with the second region 28 (a third state). The valve component 30 of the first four-way valve 20A allows the first communication channel 23 to communicate with the second region 28, the second communication channel 24 to communicate with the third region 29, and the third communication channel 25 and the fourth communication channel 26 to communicate with the first region 27 (a fourth state).

Figure 11:
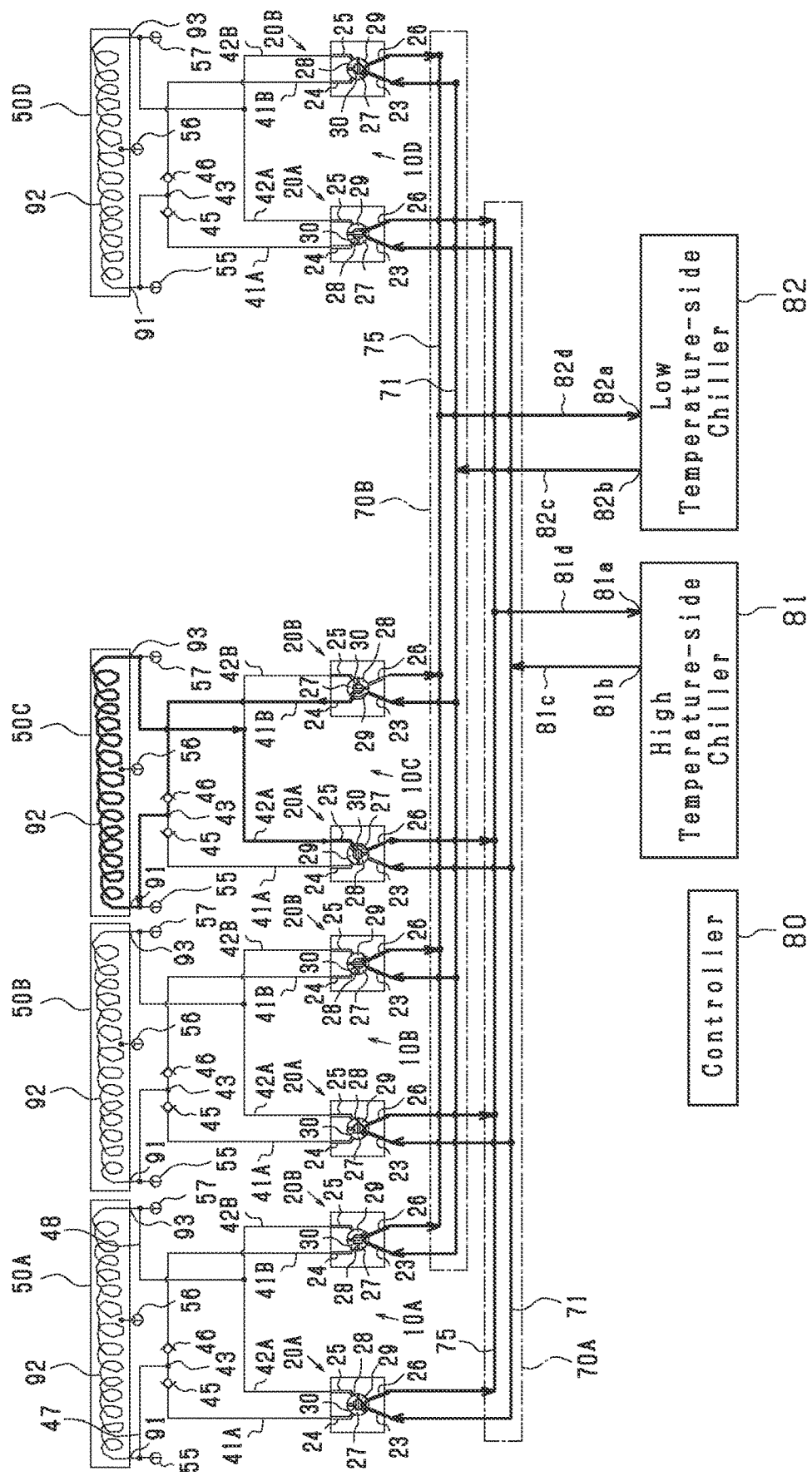
FIG. 11 is a schematic view of one or more embodiments illustrating control of fluid level adjustment.

According to the configuration, as illustrated in FIG. 11, the low temperature fluid delivered from the main outward channel 71 of the second flow channel block 70B to the first communication channel 23 of the second four-way valve 20B in the third valve unit 10C is delivered to the second duct 41B via the first region 27 and the second communication channel 24. The low temperature fluid delivered to the second duct 41B is delivered to the inlet 91 of the third work support via the second check valve 46, the join 43, and the duct 47. The low temperature fluid delivered to the inlet 91 of the third work support 50C flows through the flow channel 92 and out of the outlet 93. The low temperature fluid discharged from the outlet 93 of the third work support 50C flows into the third communication channel of the first four-way valve 20A in the third valve unit 10C via the duct 48 and the duct 42A. The low temperature fluid in the third communication channel 25 of the first four-way valve 20A in the third valve unit 10C is discharged to the main return channel 75 of the first flow channel block 70A via the third region 29 and the fourth communicating channel 26. The low temperature fluid discharged to the main return channel 75 of the first flow channel block 70A flows into the high temperature-side chiller 81. The COLD-to-HOT control may be performed in the first valve unit 10A or the second valve unit 10B instead of the third valve unit 10C. Namely, the COLD-to-HOT control may be performed in at least one of the valve units 10A to 10C.

During switching of the state from the HOT delivery state to the COLD delivery state, the flow of the high temperature fluid into the low temperature-side chiller 82 can be reduced by executing the COLD-to-HOT control for a predefined duration. The predefined duration may be a duration until when the high temperature fluids in the flow channels 92 of the work supports 50A to 50C flow out of the flow channels 92 of the work supports 50A to 50C.

Figure 8:
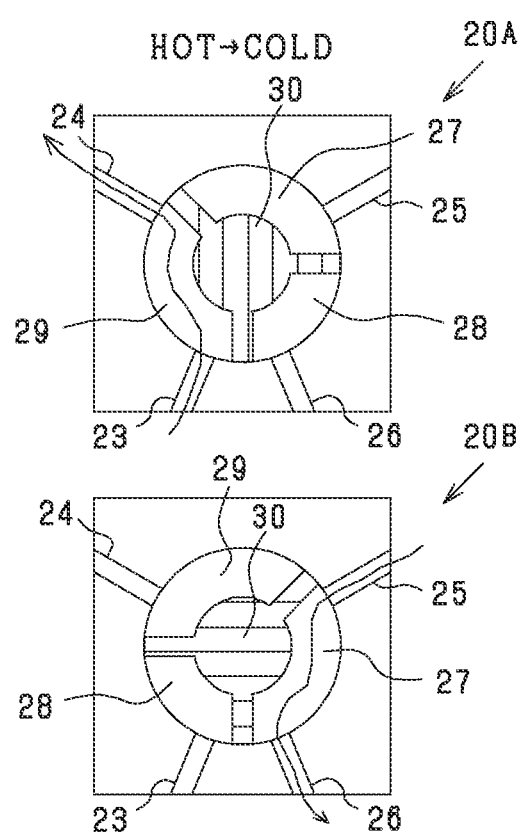
FIG. 8 is a schematic view illustrating a state of the valve component during fluid-level adjustment control.

FIG. 8 schematically illustrates a state of the valve components 30 of the first four-way valve 20A and the second four-way valve 20B during HOT-to-COLD control (fluid-level control, first adjustment driving) to transfer the fluid from the high temperature-side chiller 81 to the low temperature-side chiller 82.

By rotating the valve component 30 in the clockwise direction or in the counterclockwise direction by 180° from the NEUTRAL state in FIG. 6, the state is switched to the HOT-to-COLD control state. In the HOT-to-COLD control state, the valve component 30 of the first four-way valve 20A allows the first communication channel 23 and the second communication channel 24 to communicate with the third region 29, the third communication channel 25 to communicate with the first region 27, and the fourth communication channel 26 to communicate with the second region 28 (the third state). The valve component 30 of the second four-way valve 20B allows the first communication channel 23 to communicate with the second region 28, the second communication channel 24 to communicate with the third region 29, and the third communication channel 25 and the fourth communication channel 26 to communicate with the first region 27 (the fourth state).

Figure 12:
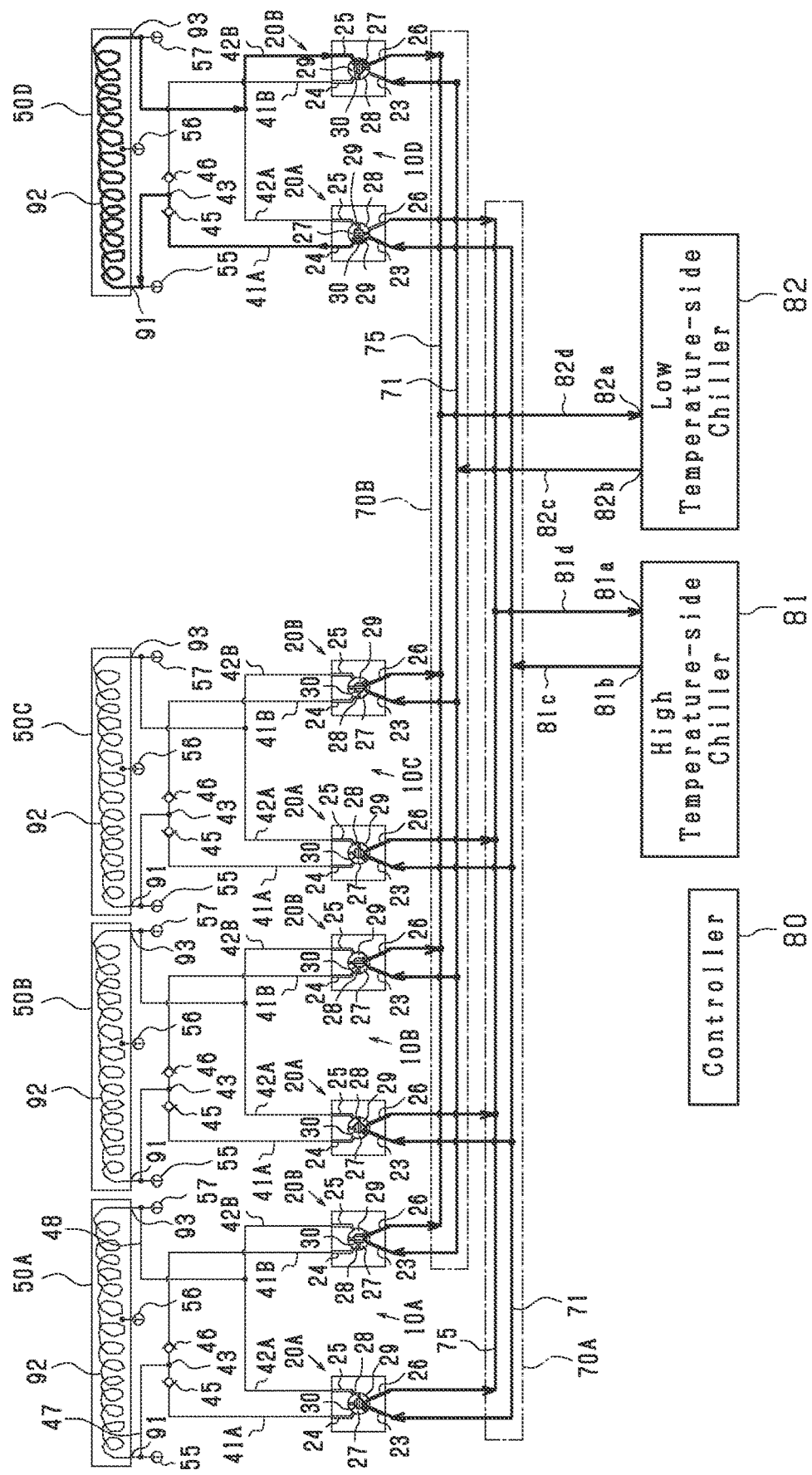
FIG. 12 is a schematic view of one or more embodiments illustrating control of fluid level adjustment.

According to the configuration, as illustrated in FIG. 12, the high temperature fluid delivered from the main outward channel 71 of the first flow channel block 70A to the first communication channel 23 of the first four-way valve in the fourth valve unit 10D is delivered to the first duct 41A via the first region 27 and the second communication channel 24. The high temperature fluid delivered to the first duct 41A is delivered to the inlet 91 of the fourth work support 50D via the first check valve 45, the join 43, and the duct 47. The high temperature fluid delivered to the inlet 91 of the fourth work support 50D flows through the flow channel 92 and out of the outlet 93. The high temperature fluid discharged from the outlet 93 of the fourth work support 50D flows into the third communication channel of the second four-way valve 20B in the fourth valve unit 10D via the duct 48 and the duct 42B. The high temperature fluid in the third communication channel 25 of the second four-way valve 20B in the fourth valve unit 10D is discharged to the main return channel 75 of the second flow channel block 70B via the third region 29 and the fourth communicating channel 26. The high temperature fluid discharged to the main return channel 75 of the second flow channel block 70B flows into the low temperature-side chiller 82.

During switching of the state from the COLD delivery state to the HOT delivery state, the flow of the low temperature fluid into the high temperature-side chiller 81 can be reduced by executing the HOT-to-COLD control for a predefined duration. The predefined duration may be a duration until when the low temperature fluids in the flow channel 92 of the fourth work support 50D flow out of the flow channel 92 of the fourth work supports 50D.

The embodiments described above have the following advantages.

The valve components 30 switch the state to the first state in which the first communication channels 23 and the second communication channels 24 communicate with the first regions 27 and the third communication channels 25 and the fourth communication channels 26 communicate with the third regions 29. Therefore, the fluid can be delivered to the work supports 50A to 50D via the first communication channels 23, the first regions 27, and the second communication channels 24 and the fluid can be discharged from the work supports 50A to 50D via the third communication channels 25, the third regions 29, and the fourth communication channels 26. The valve components 30 switch the state to the second state in which the second communication channels 24 communicate with the first regions 27, the third communication channels 25 communicate with the second regions 28, and the fourth communication channels 26 and the first communication channels 23 communicate with the third regions 29. In the state in which the fourth communication channels 26 communicate with the first communication channels 23, the second communication channels 24 are spaced apart from the third communication channels 25. During returning of the delivered fluid via the first communication channels 23, the third regions 29, and the fourth communication channels 26, the delivered fluid is less likely to flow between the second communication channels 24 and the third communication channels 25.

Each valve component 30 includes the first dividing portion 31, the second dividing portion 32, and the third dividing portion 33 that are arranged in the clockwise direction to divide the valve chamber 22 in the clockwise direction. According to the configuration, the first region 27 is defined between the first dividing portion 31 and the second dividing portion 32 in the clockwise direction, the second region 28 is defined between the second dividing portion 32 and the third dividing portion 33 in the clockwise direction, and the third region 29 is defined between the third dividing portion 33 and the first dividing portion 31 in the clockwise direction.

In the clockwise direction, a distance between the first dividing portion 31 and the second dividing portion 32 is greater than the distance between the first position 23a and the second position 24a. Therefore, the gap between the first dividing portion 31 and the second dividing portion 32, that is, the first region 27 can communicate with the first communication channel 23 and the second communication channel 24. In the clockwise direction, the distance between the first dividing portion 31 and the second dividing portion 32 is less than the distance between the first position 23a and the third position 25a. Therefore, the first region 27 is less likely to communicate with the first communication channel 23, the second communication channel 24, and the third communication channel 25. In the clockwise direction, the distance between the first dividing portion 31 and second dividing portion 32 is less than the distance between the fourth position 65a and the second position 24a. Therefore, the first region 27 is less likely to communicate with the fourth communication channel 26, the first communication channel 23, and the second communication channel 24.

In the clockwise direction, the distance between the second dividing portion 32 and the third dividing portion 33 is less than the distance between the second position 24a and the third position 25a. Therefore, the state can be switched to a state in which a gap between the second dividing portion 32 and the third dividing portion 33, that is, the second region 28 does not communicate with the second communication channel 24 and the third communication channel 25.

In the clockwise direction, the distance between the third dividing portion 33 and the first dividing portion 31 is greater than the distance between the third position 25a and the fourth position 65a. Therefore, a gap between the third dividing portion 33 and the first dividing portion 31, that is, the third region 29 can communicate with the third communication channel 25 and the fourth communication channel 26. In the clockwise direction, the distance between the third dividing portion 33 and the first dividing portion 31 is less than the distance between the third position 25a and the first position 23a. Therefore, the third region 29 is less likely to communicate with the third communication channel 25, the fourth communication channel 26, and the first communication channel 23. In the clockwise direction, the distance between the third dividing portion 33 and the first dividing portion 31 is less than the distance between the second position 24a and the fourth position 65a. Therefore, the third region 29 is less likely to communicate with the third communication channel 25, the fourth communication channel 26, and the first communication channel 23. According to the configuration, the first state in which the first communication 23 and the second communication channel 24 communicate with the first region 27 and the third communication channel 25 and the fourth communication channel 26 communicate with the third region 29 can be set.

In the clockwise direction, the distance between the third dividing portion 33 and the first dividing portion 31 is greater than the distance between the fourth position 65a and the first position 23a. Therefore, a gap between the third dividing portion 33 and the first dividing portion 31, that is, the third region 29 can communicate with the fourth communication channel 26 and the first communication channel 23. According to the configuration, the second state in which the second communication 24 communicates with the first region 27, the third communication channel 25 communicates with the second region 28, and the fourth communication channel 26 and the first communication channel 23 communicate with the third region 29 can be set.

Each valve component 30 includes the center portion 34 that extends in the axial direction of the valve chamber 22. The center portion 34 is rotatable about the center axis of the valve chamber 22. The first dividing portion 31, the second dividing portion 32, and the third dividing portion 33 have plate shapes and extend from the center portion 34 in the radial direction of the valve chamber 22. According to the configuration, the valve components 30 can be provided with simple configurations.

The valve units 10A to 10D include the first four-way valves 20A and the second four-way valves 20B. The motors 50 rotate the valve components 30 in the first four-way valves 20A and the valve components 30 in the second four-way valves 20B out of phase with each other by 90° in the clockwise direction or the counterclockwise direction. According to the configuration, each first four-way valve 20A and the corresponding second four-way valve 20B can be driven in different states and in conjunction with each other by a single motor 50.

Each first magnet coupling 60A enables non-contact torque transmission between the valve component 30 of the first four-way valve 20A and the motor 50. According to the configuration, the valve component 30 of the first four-way valve in a sealed state can easily rotate and heat transmission between the valve component 30 of the first four-way valve 20A and the motor 50 can be reduced. Similarly, each second magnet coupling 60B enables non-contact torque transmission between the valve component 30 of the second four-way valve 20B and the motor 50. According to the configuration, the valve component 30 of the second four-way valve in a sealed state can easily rotate and heat transmission between the valve component 30 of the second four-way valve 20B and the motor 50 is less likely to occur. Further, if the fluid, the flow of which is controlled by the first four-way valve 20A and the fluid, the flow of which is controlled by the second four-way valve are different in temperature, the heat transmission between the valve component of the first four-way valve 20A and the valve component 30 of the second four-way valve 20B via the motor 50 is less likely to occur.

In each first four-way valve 20A, the first communication channel 23 is coupled to the first discharge port 81$b$ via the channel, the second communication channel 24 is coupled to the inlet 91 via the channel, the third communication channel is coupled to the outlet 93 via the channel, and the fourth communication channel 26 is coupled to the first intake port 81$a$ via the channel. According to the configuration, by rotating the valve component 30 of the first four-way valve 20A by the motor 50 to switch the state to the first state in which the first communication channel 23 and the second communication channel 24 communicate with the first region 27 and the third communication channel 25 and the fourth communication channel 26 communicate with the third region 29 in the first four-way valve 20A, the fluid discharged from the high temperature-side chiller 81 flows through the flow channel 92 of corresponding one of the work supports 50A to 50D and thus the temperature of the corresponding one of the work supports 50A to 50D can be raised closer to 180° C. (the first temperature). Similarly, in each second four-way valve the first communication channel 23 is coupled to the second discharge port 82$b$ via the channel, the second communication channel 24 is coupled to the inlet 91 via the channel, the third communication channel 25 is coupled to the outlet 93 via the channel, and the fourth communication channel 26 is coupled to the second intake port 82$a$ via the channel. According to the configuration, by rotating the valve component 30 of the second four-way valve 20B by the motor 50 to switch the state to the first state, the fluid discharged from the low temperature-side chiller 82 flows through the flow channel 92 of corresponding one of the work supports 50A to 50D and thus the temperature of the corresponding one of the work supports 50A to 50D can be reduced closer to 0° C. (the second temperature).

By rotating the valve component 30 of the first four-way valve 20A by the motor 50 to switch the state to the second state in which the second communication channel 24 communicates with the first region 27, the third communication channel communicates with the second region 28, and the fourth communication channel 26 and the first communication channel 23 communicate with the third region 29 in the first four-way valve 20A, the fluid discharged from the high temperature-side chiller 81 can be returned to the high temperature-side chiller 81 via the first communication channel 23, the third region 29, and the fourth communication channel 26 of the first four-way valve 20A and thus the temperature of the corresponding one of the work supports 50A to 50D can be maintained. Similarly, by rotating the valve component 30 of the second four-way valve 20B by the motor 50 to switch the state to the second state, the fluid discharged from the low temperature-side chiller 82 can be returned to the low temperature-side chiller 82 via the first communication channel 23, the third region 29, and the fourth communication channel 26 of the second four-way valve 20B and thus the temperature of the corresponding one of the work supports 50A to 50D can be maintained.

Each first flow channel block 70A defines at least a part of the channel between the first discharge port 81$b$ and the first communication channel 23 of the first four-way valve 20A and at least a part of the channel between the fourth communication channel 26 of the first four-way valve 20A and the first intake port 81$a$. According to the configuration, the fluid flows between the high temperature-side chiller 81 and the first four-way valve 20A via the channel formed in the first flow channel block 70A. Each second flow channel block 70B defines at least a part of the channel between the second discharge port 82$b$ and the first communication channel 23 of the second four-way valve 20B and at least a part of the channel between the fourth communication channel 26 of the second four-way valve 20B and the second intake port 82$a$. According to the configuration, the fluid flows between the low temperature-side chiller 82 and the second four-way valve 20B via the channel formed in the second flow channel block 70B. The second flow channel block 70B is spaced apart from the first flow channel block 70A. Therefore, the heat transmission between the fluid at about 180° C. discharged from the high temperature-side chiller 81 and the fluid at about 0° C. discharged from the low temperature-side chiller 82 via the first flow channel block 70A and the second flow channel block 70B is less likely to occur.

The channel between the second communication channel 24 of each first four-way valve 20A and the corresponding inlet 91 and the channel between the second communication channel 24 of the corresponding second four-way valve 20B and the corresponding inlet 91 are coupled at the join 43 located upstream of the inlet 91. The channel between the second communication channel 24 of the first four-way valve 20A and the join 43 is defined by the first duct 41A. The channel between the second communication channel 24 of the second four-way valve 20B and the join 43 is defined by the second duct 41B, which is different from the first duct 41A. Therefore, heat transmission between the fluid flowing from the second communication channel 24 of the first four-way valve 20A to the join 43 and the fluid flowing from the second communication channel 24 of the second four-way valve to the join 43 via the first duct 41A and the second duct 41B is less likely to occur.

In each first duct 41A, the first check valve 45 is disposed to allow flow of the fluid from the second communication channel 24 of the corresponding first four-way valve 20A to the corresponding joint 43 and to prohibit flow of the fluid from the joint 43 to the second communication channel 24 of the first four-way valve 20 According to the configuration, the fluid that flows into corresponding one of the work supports 50A to 50D via the second duct 41B is less likely to flow back to the second communication channel 24 of the first four-way valve 20A via the first duct 41A. In each second duct 41B, the second check valve 46 is disposed to allow flow of the fluid from the second communication channel 24 of the corresponding second four-way valve 20B to the corresponding joint 43 and to prohibit flow of the fluid from the joint 43 to the second communication channel 24 of the second four-way valve 20B. According to the configuration, the fluid that flows into corresponding one of the work supports 50A to 50D via the second duct 41B is less likely to flow back to the second communication channel 24 of the second four-way valve 20B via the second duct 41B. Further, the fluid that flows to the join 43 via the first duct 41A and the fluid that flows to the join 43 via the second duct 41B are less likely to be mixed together and thus direct heat transmission between the fluids is less likely to occur.

The first flow channel blocks 70A and the second flow channel blocks 70B are supported by the same support plate 11. According to the configuration, the first flow channel blocks 70A and the second flow channel blocks 70B can be collectively disposed on the same support plate 11. Heat transmission may occur between the first flow channel blocks 70A and the second flow channel blocks 70B via the support plate 11. However, the heat insulators 78 are disposed between the first flow channel blocks 70A and the second flow channel blocks 70B. Therefore, the heat transmission is less likely to occur between the first flow channel blocks 70A and the second flow channel blocks 70B via the support plate 11.

The motors 50 rotate the valve components 30 of the first four-way valves 20A and the valve components 30 of the second four-way valves 20B out of phase with each other by 90° in the clockwise direction to switch the state to the HOT delivery state (the first distributing state) in which the first four-way valves 20A are switched to the first state and the second four-way valves 20B are switched to the second state. According to the configuration, the fluid at 180° C. discharged from the high temperature-side chiller 81 flows through the channels 92 of the work supports 50A to 50D and the fluid at 0° C. discharged from the low temperature-side chiller 82 can be returned to the low temperature-side chiller 82 without flowing through the channels 92 of the work supports 50A to 50D. Therefore, the temperatures of the work supports 50A to 50D can be raised closer to the 180° C.

The motors 50 rotate the valve components 30 of the first four-way valves 20A and the valve components 30 of the second four-way valves 20B out of phase with each other by 90° in the clockwise direction to switch the state to the NEUTRAL state in which the first four-way valves 20A are switched to the second state and the second four-way valves 20B tare switched to the second state. According to the configuration, the fluid at 180° C. discharged from the high temperature-side chiller 81 can be returned to the high temperature-side chiller 81 without flowing through the channels 92 of the work supports 50A to 50D and the fluid at 0° C. discharged from the low temperature-side chiller 82 can be returned to the low temperature-side chiller 82 without flowing through the channels 92 of the work supports 50A to 50D. Therefore, the temperatures of the work supports 50A to 50D can be maintained.

The motors 50 rotate the valve components 30 of the first four-way valves 20A and the valve components 30 of the second four-way valves 20B out of phase with each other by 90° in the clockwise direction or in the counterclockwise direction to switch the state to the COLD delivery state (the second distributing state) in which the first four-way valves 20A are switched to the second state and the second four-way valves 20B are switched to the first state. According to the configuration, the fluid at 180° C. discharged from the high temperature-side chiller 81 can be returned to the high temperature-side chiller 81 without flowing through the channels 92 of the work supports 50A to 50D and the fluid at 0° C. discharged from the low temperature-side chiller 82 flows through the channels 92 of the work supports 50A to 50D. Therefore, the temperatures of the work supports 50A to 50D can be reduced closer to the 0° C.

The controller 80 executes the target temperature control and sets the target temperature of the work supports 50A to 50D in a range greater than 0° C. and less than 180° C. When the temperatures of the work supports 50A to 50D are greater than 0° C. and less than the target temperature and 180° C., the controller 80 controls the motors 50 to switched to the HOT delivery state. When the temperatures of the work supports 50A to 50D are less than the target temperature, the fluid at 180° C. flows through the channels 92 of the work supports 50A to 50D and thus the temperatures of the work supports 50A to 50D can be raised close to the target temperature.

When the temperatures of the work supports 50A to 50D are greater than ° C. and the target temperature and less than 180° C., the controller 80 controls the motors 50 to switched to the COLD delivery state. When the temperatures of the work supports 50A to 50D are greater than the target temperature, the fluid at 0° C. flows through the channels 92 of the work supports 50A to 50D and thus the temperatures of the work supports 50A to 50D can be reduced close to the target temperature.

When the temperatures of the work supports 50A to 50D are greater than ° C. and less than 180° C. and within a predefined temperature range including the target temperature, the controller 80 controls the motors 50 to switched to the NEUTRAL state in priority to the HOT delivery state and the COLD delivery state. When the temperatures of the work supports 50A to 50D are within the predefined temperature range including the target temperature, the fluid does not flow through the channels 92 of the work supports 50A to 50D and thus the temperatures of the work supports 50A to 50D can be maintained. Namely, flow of the fluid through the channels 92 of the work supports 50A to 50D is not required to maintain the temperatures of the work supports 50A to 50D. In comparison to a configuration in which continuous flow of the fluid at 180° C. or the fluid at 0° C. through the channels 92 of the work supports 50A to 50D is required, loads on the high temperature-side chiller 81 and the low temperature-side chiller 82 can be reduced and thus energy loss can be reduced. This effect is especially remarkable when a difference between the first temperature of the fluid delivered from the high temperature-side chiller 81 (e.g., 200° C.) and the second temperature of the liquid delivered from the low temperature-side chiller 82 (−70° C.) is significant.

Each valve component 30 switches the state to the third state in which the first communication channel 23 and the second communication channel 24 communicate with the third region 29, the third communication channel 25 communicates with the first region 27, and the fourth communication channel 26 communicates with the second region 28. According to the configuration, the fluid is delivered to corresponding one of the work supports 50A to 50D via the first communication channel 23, the first region 27, and the second communication channel 24 in the four-way valve 20A, 20B. Therefore, the fluid is not returned from the corresponding one of the work supports 50A to 50D to the high temperature-side chiller 81 or the low temperature-side chiller 82. Each valve component 30 switches the state to the fourth state in which the first communication channel 23 communicates with the second region 28, the second communication channel 24 communicates with the third region 29, and the third communication channel 25 and the fourth communication channel 26 communicate with the first region 27. According to the configuration, the fluid is not delivered to corresponding one of the work supports 50A to 50D. Therefore, the fluid returns from the corresponding one of the work supports 50A to 50D to the high temperature-side chiller 81 or the low temperature-side chiller 82 via the third communication channel 25, the first region 27, and the fourth communication channel 26.

The motors 50 execute adjustment driving to rotate the valve components 30 of the first four-way valves 20A and the valve components 30 of the second four-way valves 20B out of phase with each other by 90° in the clockwise direction to switch the state to the third distributing state in which the first four-way valves 20A are switched to the third state and the second four-way valves 20B are switched to the fourth state. According to the configuration, the fluid at 180° C. is delivered from the high temperature-side chiller 81 to the work supports 50A to 50D via the first communication channels 23, the first regions 27, and the second communication channels 24 of the first four-way valves 20A and the fluid returns from the work supports 50A to 50D to the low temperature-side chiller 82 via the third communication channels 25, the first regions 27, the fourth communication channels 26 of the second four-way valves 20B. Therefore, if an amount of the fluid in the high temperature-side chiller 81 becomes greater than an amount of the fluid in the low temperature-side chiller 82, the fluid is transferred from the high temperature-side chiller 81 to the low temperature-side chiller 82. Namely, the amount of the fluid in the high temperature-side chiller 81 and the amount of the fluid in the low temperature-side chiller 82 can be adjusted closer to each other.

The motors 50 execute adjustment driving to rotate the valve components 30 of the first four-way valves 20A and the valve components 30 of the second four-way valves 20B out of phase with each other by 90° in the clockwise direction to switch the state to the fourth distributing state in which the first four-way valves 20A are switched to the fourth state and the second four-way valves 20B are switched to the third state. According to the configuration, the fluid at 0° C. is delivered from the low temperature-side chiller 82 to the work supports 50A to 50D via the first communication channels 23, the first regions 27, and the second communication channels 24 of the second four-way valves 20B and the fluid returns from the work supports 50A to 50D to the high temperature-side chiller 81 via the third communication channels 25, the first regions 27, the fourth communication channels 26 of the first four-way valves 20A. Therefore, if an amount of the fluid in the low temperature-side chiller 82 becomes greater than an amount of the fluid in the high temperature-side chiller 81, the fluid is transferred from the low temperature-side chiller 82 to the high temperature-side chiller 81. Namely, the amount of the fluid in the high temperature-side chiller 81 and the amount of the fluid in the low temperature-side chiller 82 can be adjusted closer to each other.

The controller 80 executes the adjustment driving with the motors 50 when the target temperature control is not performed. Therefore, the amount of the fluid in the high temperature-side chiller 81 and the amount of the fluid in the low temperature-side chiller 82 can be adjusted closer to each other without disturbing the target temperature control.

The temperature control system includes the fourth valve unit 10D and the third valve unit 10C. The fourth valve unit 10D executes the first adjustment driving to deliver the fluid from the high temperature-side chiller 81 to the low temperature-side chiller 82. The third valve unit 10C executes the second adjustment driving to deliver the fluid from the low temperature-side chiller 82 to the high temperature-side chiller 81. Even when the amount of the liquid in the high temperature-side chiller 81 becomes greater than the amount of the liquid in the low temperature-side chiller 82 or the amount of the liquid in the low temperature-side chiller 82 becomes greater than the amount of the liquid in the high temperature-side chiller 81, the fluid in the high temperature-side chiller 81 and the amount of the fluid in the low temperature-side chiller 82 can be adjusted closer to each other.

The sealing members 65a and 67a do not rub against other members. According the configuration, degradation of the sealing members 65a and 67a can be reduced and leakage of the fluid in the first four-way valves 20A is less likely to occur. Further, in comparison to a configuration in which sealing members (e.g., rotary shaft sealants) rub against other members, loads on the motors 50 can be reduced.

The embodiments described above may be modified as below and implemented. Components and portions the same as those in the embodiments described above may be denoted by reference sings the same as the reference sings that denote the components and the portions of the embodiments described above and will not be described.

Either the heat insulators 78 under the first flow channel blocks 70A or the heat insulators 78 under the second flow channel blocks 70B may be omitted. Even in such a configuration, one heat insulator 78 is disposed between each first flow channel block 70A and the corresponding second flow channel block 70B. Therefore, heat transmission via the support plate 11 is less likely to occur between the first flow blocks 70A and the second flow blocks 70B. The support plate 11 may be made of a heat insulating material. Because the support plate 11 that is a substation of the heat insulators 78 is present between the first flow channel blocks 70A and the second flow channel blocks 70B, heat transmission via the support plate 11 is less likely to occur between the first flow blocks 70A and the second flow blocks 70B.

The configuration of the fourth valve unit 10D may be altered to the configuration of each of the valve units 10A to 10C. In such as case, the HOT-to-COLD control is not performed. The configuration of each of the valve units 10A to 10C may be altered to the configuration of the fourth valve unit 10D. In such a case, the COLD-to-HOT control is not performed.

In the embodiments described above, the clockwise direction (CW) is defined as the predefined rotational direction. However, the counterclockwise direction (CCW) may be defined as the predefined rotational direction.

The control of the fluid may be performed by rotating the valve components 30 in the valve units 10A to 10D only in the clockwise direction or only in the counterclockwise direction.

The flow amount of the fluid may be adjusted by blocking parts of the first communication channels 23, the second communication channels 24, the third communication channels 25, and the fourth communication channels 26 with the first diving portions 31, the second dividing portions 32, and the third dividing portions 33.

The shape of each of the first dividing portions 31, the second dividing portions 32, and the third dividing portions 33 are not limited to the planar shape and may be a curved plate shape (a plate shape). Each of the valve components 30 may have a columnar shape and include flow channels corresponding to the first region 27, the second region 28, and the third region 29. In such a valve components 30, a first dividing portion, a second dividing portion, and a third dividing portion may be formed from portions other than the flow channels. Each of the valve chambers 22 may have a spherical shape and each of the valve components 30 may have a spherical shape corresponding to the valve chambers 22.

The fluid is not limited to the fluorine-based inert fluid. Alcohol, water, or oil may be used for the fluid. The fluid is not limited to a liquid. A gas may be used for the fluid.

A speed changer (e.g., a gear mechanism) may be disposed between the motor 50 and each of the first magnet coupling 60A and the corresponding second magnet coupling 60B to increase or decrease the rotation speed of each motor 50.

The valve component 30 of each first four-way valve 20A and the valve component 30 of the corresponding second four-way valve 20B may be rotated out of phase with (and in conjunction with) each other by different motors. The valve component 30 of each first four-way valve 20A and the valve component 30 of the corresponding second four-way valve 20B may be rotated independently of each other by different motors. The first four-way valves 20A and the fourth four-way valves 20B may be independently used.

The modified examples described above may be implemented in combination.

The present disclosure has been described in conformity with examples but is not limited to the examples and the structures therein. Further, the present disclosure encompasses a variety of variation examples and variations in the scope of equivalents of the present disclosure. In addition, a variety of combinations and forms and even other combinations and forms to which only one element or two or more elements are added fall within the scope and ideological range of the present disclosure.

What is claimed is:

1. A four-way valve comprising:
a body comprising:
   a valve chamber;
   a first communication channel;
   a second communication channel;
   a third communication channel; and
   a fourth communication channel, wherein
   the first to fourth communication channels communicate with the valve chamber at positions arranged in sequence in a predefined rotational direction and cause the valve chamber to communicate with an outside; and
a valve component that divides the valve chamber into a first region, a second region, and a third region arranged in sequence in the predefined rotational direction, and is rotatable in the predefined rotational direction, wherein
the valve component switches the four-way valve to be in at least one of:
   a first state in which the first communication channel and the second communication channel communicate with the first region and the third communication channel and the fourth communication channel communicate with the third region; and
   a second state in which the second communication channel communicates with the first region, the third communication channel communicates with the second region, and the fourth communication channel and the first communication channel communicate with the third region,
the valve chamber has a columnar shape and has:
   a first position at which the first communication channel communicates with an outer periphery of the valve chamber;
   a second position at which the second communication channel communicates with the outer periphery of the valve chamber;
   a third position at which the third communication channel communicates with the outer periphery of the valve chamber; and
   a fourth position at which the fourth communication channel communicates with the outer periphery of the valve chamber, wherein the first to fourth positions are arranged in sequence in the predefined rotational direction along one of circumferential directions of the valve chamber, the valve component includes:
- a center portion that extends in an axial direction of the valve chamber;
- a first divider;
- a second divider: and
- a third divider, wherein
- the first to third dividers are arranged in sequence in the predefined rotational direction, and divide the valve chamber into the first region, the second region, and third region in the predefined rotational direction, the center portion is rotatable about a central axis of the valve chamber, the first divider, the second divider, and the third divider have plate shapes and extend from the center portion in a radial direction of the valve chamber, and in the predefined rotational direction:
- a distance between the first divider and the second divider is greater than a distance between the first position and the second position and less than a distance between the first position and the third position and a distance between the fourth position and the second position;
- a distance between the second divider and the third divider is less than a distance between the second position and the third position; and
- a distance between the third divider and the first divider is greater than a distance between the third position and the fourth position and a distance between the fourth position and the first position and less than a distance between the third position and the first position and a distance between the second position and the fourth position.

2. A valve unit comprising:
a first four-way valve and a second four-way valve, each of which is the four-way valve according to claim 1;
a driver that comprises a rotary shaft coupled to the valve component of the first four-way valve and the valve component of the second four-way valve, and rotates the valve component of the first four-way valve and the valve component of the second four-way valve such that phases of the valve components are shifted from each other by 90° in the predefined rotational direction;
a first magnet coupling that enables non-contact torque transmission between the valve component of the first four-way valve and a first end of the rotary shaft; and
a second magnet coupling that enables non-contact torque transmission between the valve component of the second four-way valve and a second end of the rotary shaft, the second end being opposite to the first four-way valve.

3. A temperature control system comprising:
the valve unit according to claim 2;
a first adjustment device that comprises a first intake port and a first discharge port, takes a fluid in the first adjustment device through the first intake port, adjusts a temperature of the fluid to be a first temperature, and discharges the fluid through the first discharge port;
a second adjustment device that comprises a second intake port and a second discharge port, takes a fluid in the second adjustment device through the second intake port, adjusts a temperature of the fluid to be a second temperature less than the first temperature, and discharges the fluid through the second discharge port; and an object to be controlled that includes an inlet, a channel, and an outlet, wherein the fluid enters through the inlet, flows through the channel, and flows out through the outlet, wherein in the first four-way valve, the first communication channel is coupled to the first discharge port via the channel, the second communication channel is coupled to the inlet via the channel, the third communication channel is coupled to the outlet via the channel, and the fourth communication channel is coupled to the first intake port via the channel, and in the second four-way valve, the first communication channel is coupled to the second discharge port via the channel, the second communication channel is coupled to the inlet via the channel, the third communication channel is coupled to the outlet via the channel, and the fourth communication channel is coupled to the second intake port via the channel.

4. The temperature control system according to claim 3, further comprising:
a first flow channel block that defines at least a part of a channel between the first discharge port and the first communication channel of the first four-way valve and at least a part of a channel between the first intake port and the fourth communication channel of the first four-way valve; and
a second flow channel block that is spaced apart from the first flow channel block and defines at least a part of a channel between the second discharge port and the first communication channel of the second four-way valve and at least a part of a channel between the second intake port and the fourth communication channel of the second four-way valve, wherein
a channel between the second communication channel of the first four-way valve and the inlet and a channel between the second communication channel of the second four-way valve and the inlet are coupled to each other at a join located upstream of the inlet, the temperature control system further comprises:
a first duct that defines a channel between the second communication channel of the first four-way valve and the join, wherein in the first duct, a first check valve is disposed to allow a flow of the fluid from the second communication channel of the first four-way valve to the join and to prohibit a flow of the fluid from the join to the second communication channel of the first four-way valve, and
a second duct that defines a channel between the second communication channel of the second four-way valve and the join, wherein in the second duct, a second check valve is disposed to allow a flow of the fluid from the second communication channel of the second four-way valve to the join and to prohibit a flow of the fluid from the join to the second communication channel of the second four-way valve.

5. The temperature control system according to claim 4, further comprising
a support that supports both the first flow channel block and the second flow channel block, and
a heat insulator that is disposed between the first flow channel block and the second flow channel block.

6. The temperature control system according to claim 3, wherein
the driver switches the first and second four-way valves, by rotating the valve component of the first four-way valve and the valve component of the second four-way valve such that phases of the valve components are shifted from each other by 90° in the predefined rotational direction, to be in at least one of:
a first distributing state in which the first four-way valve is in the first state and the second four-way valve is in the second state;
a non-distributing state in which the first four-way valve is in the second state and the second four-way valve is in the second state; and
a second distributing state in which the first four-way valve is in the second state and the second four-way valve is in the first state.

7. The temperature control system according to claim 6, further comprising:
a controller that sets a target temperature of the object to be greater than the second temperature and less than the first temperature, and causes the driver to control the target temperature by:
in a case that a temperature of the object is greater than the second temperature and less than the target temperature and the first temperature, switching the first and second four-way valves to be in the first distributing state;
in a case that the temperature of the object is greater than the second temperature and the target temperature and less than the first temperature, switching the first and second four-way valves to be in the second distributing state;
in a case that the temperature of the object is greater than the second temperature, less than the first temperature, and within a predefined temperature range including the target temperature, switching the first and second four-way valves to be in the non-distributing state in priority to the first distributing state and the second distributing state.

8. The temperature control system according to claim 7, wherein
each of the valve components further switches each of the first and second four-way valves to be in at least one of:
a third state in which the first communication channel and the second communication channel communicate with the third region, the third communication channel communicates with the first region, and the fourth communication channel communicates with the second region; and
a fourth state in which the first communication channel communicates with the second region, the second communication channel communicates with the third region, and the third communication channel and the fourth communication channel communicate with the first region, and
the driver further executes adjustment driving by rotating the valve component of the first four-way valve and the valve component of the second four-way valve such that the phases of the valve components are shifted from each other by 90° in the predefined rotational direction, and switches the first and second four-way valves to be in a third distributing state in which the first four-way valve is in the third state and the second four-way valve is in the fourth state.

9. The temperature control system according to claim 7, wherein
each of the valve components further switches each of the first and second four-way valves to be in at least one of:
a third state in which the first communication channel and the second communication channel communicate with the third region, the third communication channel communicates with the first region, and the fourth communication channel communicates with the second region; and
a fourth state in which the first communication channel communicates with the second region, the second communication channel communicates with the third region, and the third communication channel and the fourth communication channel communicate with the first region, and
the driver further executes adjustment driving by rotating the valve component of the first four-way valve and the valve component of the second four-way valve such that the phases of the valve components are shifted from each other by 90° in the predefined rotational direction, and switches the first and second four-way valves to be in a fourth distributing state in which the first four-way valve is in the fourth state and the second four-way valve is in the third state.

10. The temperature control system according to claim 8, wherein
the controller causes the driver to execute the adjustment driving in a case that the target temperature control is not performed.

11. The temperature control system according to claim 8, further comprising:
a first valve unit and a second valve unit, each of which is the valve unit, wherein
the driver of the first valve unit executes first adjustment driving by rotating the valve component of the first four-way valve and the valve component of the second four-way valve such that the phases of the valve components are shifted from each other by 90° in the predefined rotational direction, and switches the first and second four-way valves to be in the third distributing state in which the first four-way valve is in the third state and the second four-way valve is in the fourth state; and
the driver of the second valve unit executes second adjustment driving by rotating the valve component of the first four-way valve and the valve component of the second four-way valve such that the phases of the valve components are shifted from each other by 90° in the predefined rotational direction, and switches the first and second four-way valves to be in the fourth distributing state in which the first four-way valve is in the fourth state and the second four-way valve is in the third state.

* * * * *